US012671607B2

(12) United States Patent
Niu et al.

(10) Patent No.: US 12,671,607 B2
(45) Date of Patent: Jun. 30, 2026

(54) TUNNEL KEEPALIVE METHOD, NETWORK DEVICE, SYSTEM, AND STORAGE MEDIUM

(71) Applicant: Huawei Technologies Co., Ltd., Shenzhen (CN)

(72) Inventors: Chengguang Niu, Beijing (CN); Zhouyi Yu, Beijing (CN); Hongtao Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 605 days.

(21) Appl. No.: 18/175,274

(22) Filed: Feb. 27, 2023

(65) Prior Publication Data

US 2023/0208679 A1     Jun. 29, 2023

Related U.S. Application Data

(63) Continuation of application No. PCT/CN2021/114141, filed on Aug. 23, 2021.

(30) Foreign Application Priority Data

Aug. 31, 2020     (CN) ......................... 202010899677.9

(51) Int. Cl.
| | |
|---|---|
| *H04L 12/46* | (2006.01) |
| *H04L 12/28* | (2006.01) |
| *H04L 43/10* | (2022.01) |

(52) U.S. Cl.
CPC ...... H04L 12/4641 (2013.01); H04L 12/2801 (2013.01); H04L 43/10 (2013.01)

(58) Field of Classification Search
CPC . H04L 12/4641; H04L 12/2801; H04L 12/06; H04L 43/10; H04W 76/19; H04W 76/25; H04W 88/16

(Continued)

(56) References Cited

U.S. PATENT DOCUMENTS

| | | | |
|---|---|---|---|
| 2015/0156674 A1* | 6/2015 | Tan ........................ | H04W 12/06 |
| | | | 370/230 |
| 2018/0013684 A1* | 1/2018 | Liu ........................ | H04M 15/66 |

(Continued)

FOREIGN PATENT DOCUMENTS

| | | |
|---|---|---|
| EP | 3528438 A1 | 8/2019 |

OTHER PUBLICATIONS

Broadband Forum: "TR-459 Control and User Plane Separation for a disaggregated BNG", Issue: 1, Apr. 2020, XP052331094, total 103 pages.

(Continued)

*Primary Examiner* — Jungwon Chang

(74) *Attorney, Agent, or Firm* — Slater Matsil, LLP

(57) ABSTRACT

Embodiments of this application disclose a tunnel keepalive method, a network device, a system, and a storage medium, and pertain to the field of communications technologies. In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device.

20 Claims, 6 Drawing Sheets

(58) Field of Classification Search
USPC .................................. 370/254, 230; 709/224
See application file for complete search history.

(56) References Cited

U.S. PATENT DOCUMENTS

| | | | |
|---|---|---|---|
| 2019/0230060 A1* | 7/2019 | Yin ..................... | H04L 61/5061 |
| 2019/0230061 A1* | 7/2019 | Li ........................... | H04W 8/26 |
| 2022/0030438 A1* | 1/2022 | Song ..................... | H04W 24/04 |
| 2023/0132861 A1* | 5/2023 | Song .................. | H04L 41/0893 |
| | | | 709/224 |

OTHER PUBLICATIONS

3GPP TS 29.244 V16.4.0 (Jun. 2020), "3rd Generation Partnership Project; Technical Specification Group Core Network and Terminals; Interface between the Control Plane and the User Plane Nodes; Stage 3 (Release 16)", total 310 pages.
W.Townsley, et al, "Layer Two Tunneling Protocol "L2TP"", RFC 2661, Network Working Group, Aug. 1999, total 80 pages.
V. Jain, et al, "Fail Over Extensions for Layer 2 Tunneling Protocol (L2TP) "failover"", RFC 4951, Network Working Group, Aug. 2007, total 26 pages.
Kenneth Wan, "WT-459 Control and User Plane Separation for a disaggregated BNG", broadband forum, Nov. 5, 2019, total 90 pages.

* cited by examiner

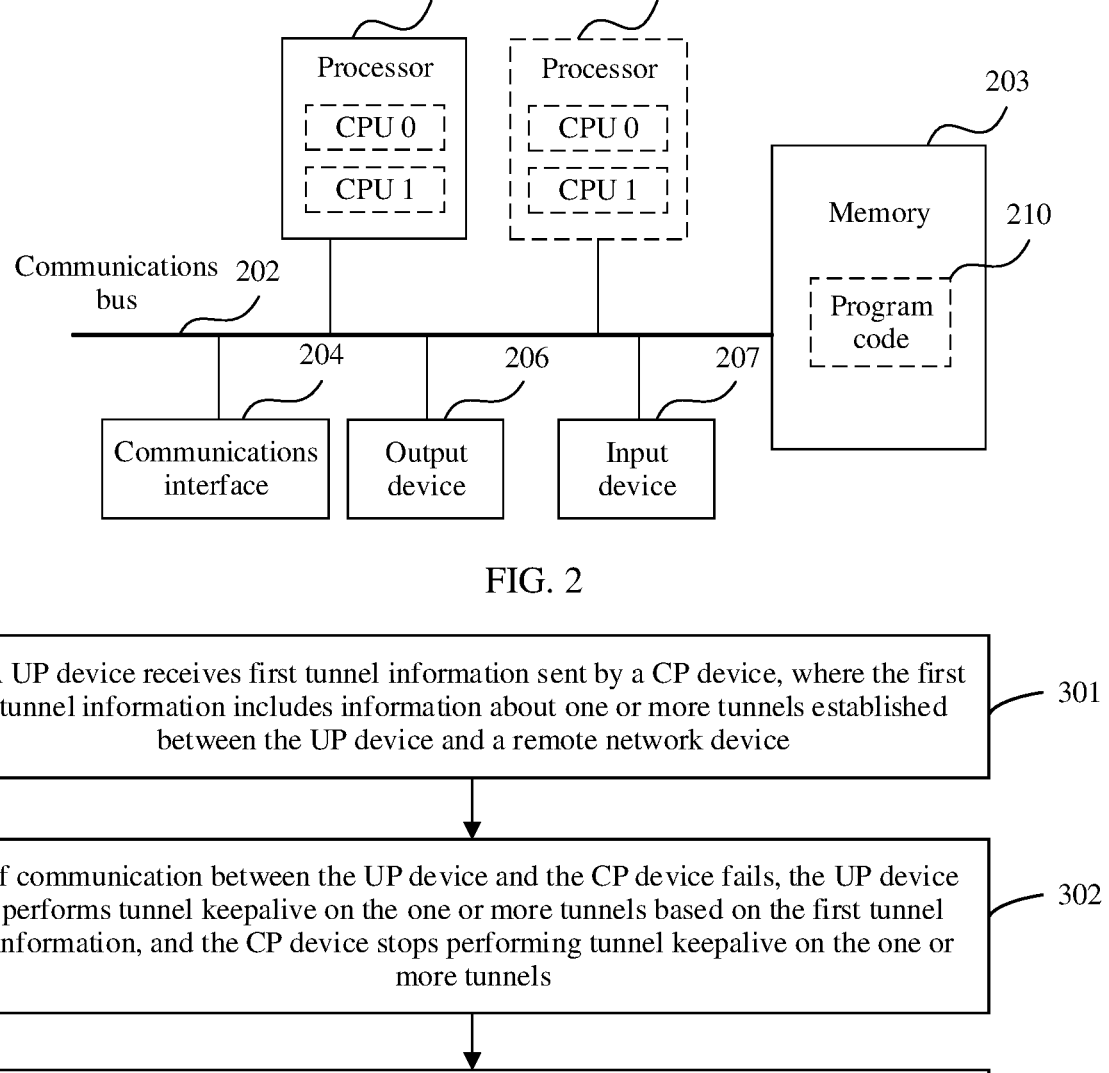

FIG. 2

A UP device receives first tunnel information sent by a CP device, where the first tunnel information includes information about one or more tunnels established between the UP device and a remote network device — 301

If communication between the UP device and the CP device fails, the UP device performs tunnel keepalive on the one or more tunnels based on the first tunnel information, and the CP device stops performing tunnel keepalive on the one or more tunnels — 302

If communication between the CP device and the UP device recovers, the CP device performs tunnel keepalive on the one or more tunnels again, and the UP device stops performing tunnel keepalive on the one or more tunnels — 303

FIG. 3

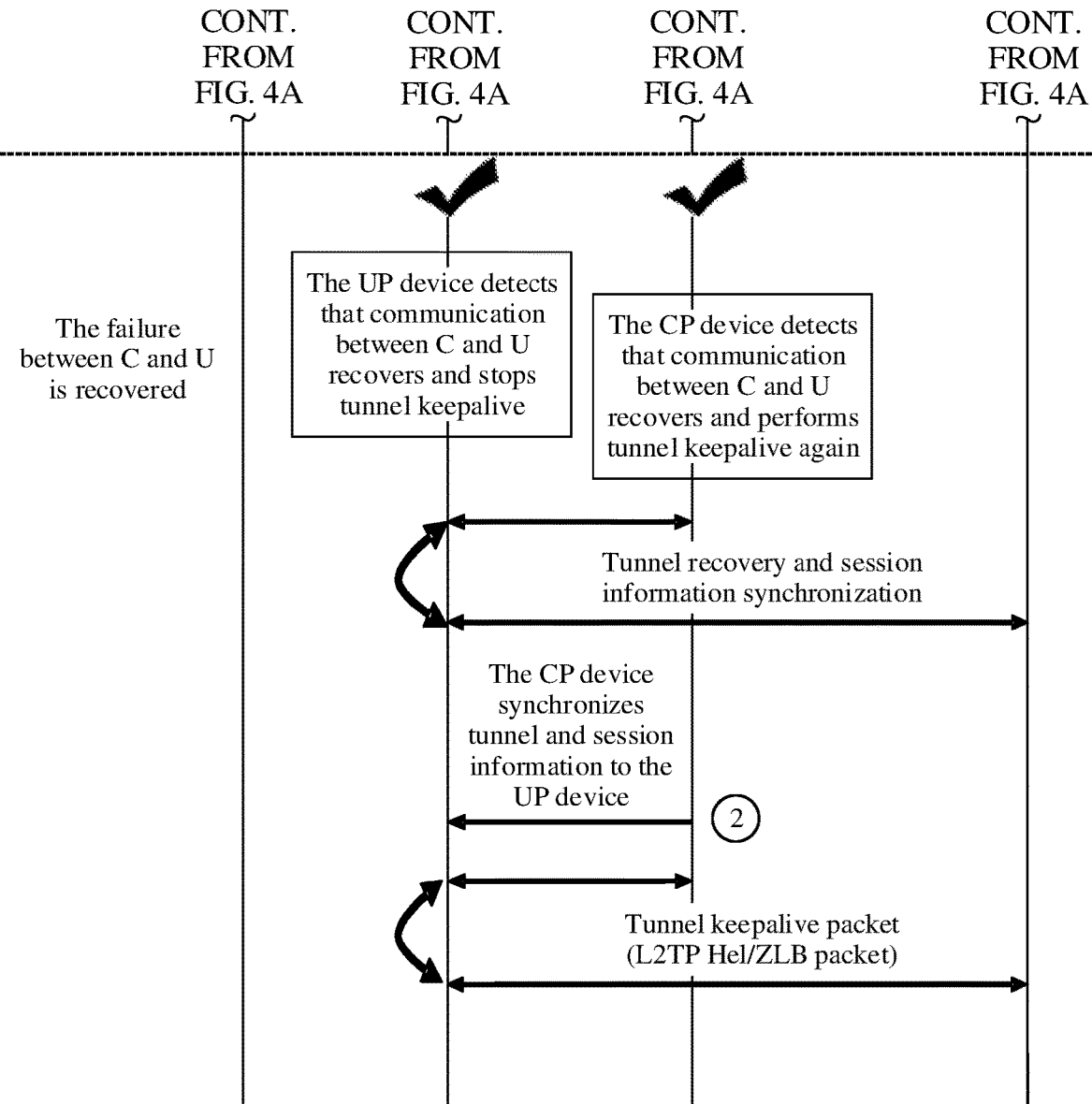

CONT. FROM FIG. 4A     CONT. FROM FIG. 4A     CONT. FROM FIG. 4A     CONT. FROM FIG. 4A

The failure between C and U is recovered

The UP device detects that communication between C and U recovers and stops tunnel keepalive The CP device detects that communication between C and U recovers and performs tunnel keepalive again Tunnel recovery and session information synchronization The CP device synchronizes tunnel and session information to the UP device

②

Tunnel keepalive packet (L2TP Hel/ZLB packet)

TUNNEL KEEPALIVE METHOD, NETWORK DEVICE, SYSTEM, AND STORAGE MEDIUM

CROSS-REFERENCE TO RELATED APPLICATIONS

This application is a continuation of International Application No. PCT/CN2021/114141, filed on Aug. 23, 2021, which claim priority to Chinese Patent Application No. 202010899677.9, filed on Aug. 31, 2020. The disclosures of the aforementioned applications are hereby incorporated by reference in their entireties.

TECHNICAL FIELD

Embodiments of this application relate to the field of communications technologies, and in particular, to a tunnel keepalive method, a network device, a system, and a storage medium.

BACKGROUND

Currently, a terminal can access a network by using a broadband network gateway (BNG) device deployed in the network. For a conventional BNG device, a control plane (CP) function and a user plane (UP) function are coupled. With development of communications technologies, the industry proposes a BNG in which a control plane function and a user plane function are separated. Such a BNG is referred to as a virtual broadband network gateway (vBNG), and includes a CP device and a UP device. When a layer 2 tunnel protocol (L2TP) access concentrator (LAC) is implemented by using the vBNG, the CP device can establish a tunnel between the UP device and a remote L2TP network server (LNS), to ensure that the terminal successfully accesses a remote network. However, to ensure that a user service is not interrupted, the tunnel needs to be kept alive.

A related technology provides a tunnel keepalive method. In the method, after a CP device establishes a tunnel between a UP device and an LNS, a tunnel keepalive packet is periodically sent between the CP device and the LNS through the UP device, to keep the tunnel alive, so as to ensure that a user service is not interrupted. That is, the UP device is responsible for forwarding a tunnel keepalive packet between the CP device and the LNS, so that the CP device and the LNS can communicate to keep the tunnel alive, thereby ensuring that the user service is not interrupted.

However, if a failure occurs in communication between the CP device and the UP device, tunnel keepalive cannot be performed between the CP device and the LNS by using a tunnel keepalive packet, and tunnel teardown is triggered. Consequently, a connection between a terminal and a remote network is disconnected, that is, a user service is interrupted.

SUMMARY

Embodiments of this application provide a tunnel keepalive method, a network device, a system, and a storage medium, to ensure that a network connection of a terminal is not disconnected when a communication failure occurs between a UP device and a CP device. The technical solutions are as follows:

According to a first aspect, a tunnel keepalive method is provided, where a control plane CP device and a user plane UP device are used to interact with a remote network device to ensure that a terminal accesses a network, and the method includes: the UP device receives first tunnel information sent by the CP device, where the first tunnel information includes information about one or more tunnels established between the UP device and the remote network device; and if the UP device detects that communication between the UP device and the CP device fails, the UP device performs tunnel keepalive on the one or more tunnels based on the first tunnel information.

In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device. This solution can ensure that a network connection between a terminal and a remote end is not interrupted, that is, a user service is not affected.

In this embodiment of this application, before the failure occurs in communication between the UP device and the CP device, the CP device sends the first tunnel information to the UP device in a plurality of implementations. Refer to related descriptions in the following second aspect. Details are not described herein again.

Optionally, the first tunnel information is carried in a packet forwarding control protocol (PFCP) update request packet, the one or more tunnels are L2TP tunnels, and information about each tunnel in the one or more tunnels includes tunnel description information. If the L2TP tunnel is created according to internet protocol version 4 (IPv4), the tunnel description information includes a local tunnel identifier, a remote tunnel identifier, a local tunnel IPv4 address, and a remote tunnel IPv4 address. If the L2TP tunnel is created according to internet protocol version 6 (IPv6), the tunnel description information includes a local tunnel identifier, a remote tunnel identifier, a local tunnel IPv6 address, and a remote tunnel IPv6 address. In other words, the tunnel information is synchronized from the CP device to the UP device by extending the PFCP packet.

In this embodiment of this application, when communication between the UP device and the CP device is normal, the CP device can further synchronize first session information to the UP device, and the UP device receives the first session information sent by the CP device. The first session information includes information about a session carried on the one or more tunnels. It should be noted that, because the terminal implements service communication by using the session carried on the tunnel, the CP device synchronizes session information to the UP device, and in a subsequent tunnel keepalive process of the UP device, session communication between the terminal and the remote network device is implemented based on the session information.

Optionally, the first session information is carried in a PFCP update request packet, and the information about the session carried on each of the one or more tunnels includes a local tunnel identifier, a local session identifier, and a remote session identifier. In other words, the CP device synchronizes a session packet to the UP device by extending the PFCP packet.

Optionally, in this embodiment of this application, after receiving the PFCP update request packet, the UP device sends a PFCP update reply packet to the CP device.

Optionally, the UP device communicates with the CP device through a control packet redirection interface and a state control interface. That the UP device detects that communication between the UP device and the CP device fails includes: the UP device monitors statuses of the control packet redirection interface and the state control interface; and if the UP device detects that the status of the control packet redirection interface and/or the status of the state control interface are/is abnormal, the UP device determines that a failure is detected in communication between the UP device and the CP device. That is, the UP device perceives a communication status between the UP device and the CP device by detecting in real time a status of a communication interface between the UP device and the CP device.

It should be noted that, in this embodiment of this application, tunnel keepalive is independently performed for each tunnel, that is, each tunnel is corresponding to tunnel keepalive sequence numbers. The UP device or the CP device periodically exchanges a tunnel keepalive packet with the remote network device, to implement tunnel keepalive for each tunnel. In this embodiment of this application, the first tunnel information includes identifiers of the one or more tunnels, and a tunnel keepalive packet carries tunnel keepalive sequence numbers of a corresponding tunnel.

However, when communication between the UP device and the CP device fails, the tunnel is not expected to be torn down, that is, a user service of the terminal is not expected to be interrupted. Therefore, the UP device continues to perform tunnel keepalive. The following describes an implementation in which the UP device performs tunnel keepalive when the UP device detects that communication between the UP device and the CP device fails.

First implementation: That the UP device performs tunnel keepalive on the one or more tunnels based on the first tunnel information includes: the UP device monitors a first tunnel keepalive packet sent by the remote network device, where the first tunnel keepalive packet carries an identifier and tunnel keepalive sequence numbers of a target tunnel; and the UP device sends a second tunnel keepalive packet to the remote network device based on the identifier and the tunnel keepalive sequence numbers of the target tunnel, and the identifiers of the one or more tunnels.

It should be noted that, starting from sending the second tunnel keepalive packet to the remote network device, the UP device starts to periodically exchange tunnel keepalive packets with the remote network device, to implement tunnel keepalive.

In this implementation, the remote network device does not sense that a failure occurs in communication between the CP device and the UP device. The UP device replaces the CP device and performs tunnel keepalive based on information about the tunnel currently maintained by the remote network device, that is, tunnel keepalive is performed quickly and seamlessly.

It can be learned from the foregoing description that, when communication between the UP device and the CP device is normal, the CP device further sends the first session information to the UP device. In this way, while keeping the tunnel alive, the UP device can further maintain, based on the first session information, a data packet between the terminal and the remote network device on the session carried on the tunnel, to ensure normal service communication of the terminal.

Second implementation: That the UP device performs tunnel keepalive on the one or more tunnels based on the first tunnel information includes: the UP device resets tunnel keepalive sequence numbers of a target tunnel in the first tunnel information, where the target tunnel is one of the one or more tunnels; the UP device indicates, based on the reset tunnel keepalive sequence numbers of the target tunnel, the remote network device to reset the tunnel keepalive sequence numbers of the target tunnel; after the remote network device successfully resets the tunnel keepalive sequence numbers of the target tunnel, the UP device performs tunnel keepalive on the target tunnel based on the reset tunnel keepalive sequence numbers of the target tunnel and an identifier of the target tunnel.

In this implementation, the UP device needs to perform tunnel failure recovery with the remote network device once, that is, perform data reconciliation with the remote network device once and reset tunnel keepalive sequence numbers, to ensure tunnel consistency between the UP device and the remote network device.

Optionally, that the UP device indicates, based on the reset tunnel keepalive sequence numbers of the target tunnel, the remote network device to reset the tunnel keepalive sequence numbers of the target tunnel includes: the UP device sends a first control request packet to the remote network device, where the first control request packet carries the identifier of the target tunnel, the reset tunnel keepalive sequence numbers of the target tunnel, and sequence number reset indication information; and the UP device receives a first control reply packet sent by the remote network device, where the first control reply packet is used to indicate that the remote network device successfully resets the tunnel keepalive sequence numbers of the target tunnel.

Optionally, before the UP device resets the tunnel keepalive sequence numbers of the target tunnel, the method further includes: the UP device creates a data reconciliation tunnel between the UP device and the remote network device; the UP device sends a first tunnel data reconciliation packet to the remote network device through the data reconciliation tunnel, where the first tunnel data reconciliation packet carries an identifier of a tunnel established between the UP device and the remote network device that is stored in the UP device; the UP device receives a first tunnel reconciliation reply packet sent by the remote network device, where the first tunnel reconciliation reply packet carries an identifier of a tunnel established between the remote network device and the UP device that is stored in the remote network device; and the UP device determines an intersection set of the tunnel identifier carried in the first tunnel data reconciliation packet and the tunnel identifier carried in the first tunnel reconciliation reply packet as the identifiers of the one or more tunnels.

That is, before the UP device and the remote network device reset the tunnel keepalive sequence numbers, the UP device first performs data reconciliation with the remote network device, to ensure tunnel consistency between the UP device and the remote network device through data reconciliation. In this way, the UP device can perform tunnel keepalive more accurately.

It can be learned from the foregoing that, when communication between the UP device and the CP device is normal, the CP device further sends first session information to the UP device. That is, before the UP device performs tunnel keepalive on the one or more tunnels based on the first tunnel information, the method further includes: the UP device receives the first session information sent by the CP device, where the first session information includes information about a session carried on the one or more tunnels. In this way, after the UP device creates the data reconciliation tunnel between the UP device and the remote network device, the method further includes: the UP device sends a first session data reconciliation packet to the remote network device, where the first session data reconciliation packet carries identifiers of one or more first reference sessions, and the one or more first reference sessions are sessions carried on the target tunnel that are stored in the UP device; the UP device receives a first session reconciliation reply packet sent by the remote network device, where the first session reconciliation reply packet carries identifiers of one or more second reference sessions, and the one or more second reference sessions are sessions carried on the target tunnel that are stored in the remote network device; and the UP device determines an intersection set of the identifiers of the one or more first reference sessions and the identifiers of the one or more second reference sessions as an identifier of a session carried on the target tunnel.

In other words, in this embodiment of this application, the UP device can further update the information, in the first session information, about the session carried on the target tunnel, to perform failure recovery on the session carried on the target tunnel.

It should be noted that the UP device and the remote network device delete the session that has not been created between the UP device and the remote network device through session failure recovery, that is, a session in a half-connected state is cleared.

In the second implementation, tunnel failure recovery and session failure recovery are performed between the UP device and the remote network device, to ensure consistency of a tunnel and a session between the UP device and the remote network device, so that tunnel keepalive can be more accurately performed on the tunnel established between the UP device and the remote network device.

The method in which the UP device performs tunnel keepalive is described above by using the target tunnel in the one or more tunnels as an example. For a tunnel other than the target tunnel in the one or more tunnels, the UP device can perform tunnel keepalive according to a tunnel keepalive method the same as that for the target tunnel. Details are not described in this embodiment of this application.

In this embodiment of this application, after the UP device performs tunnel keepalive on the one or more tunnels based on the first tunnel information, the method further includes: if the UP device detects that communication between the UP device and the CP device is recovered, the UP device stops performing tunnel keepalive on the one or more tunnels, and the CP device needs to perform tunnel keepalive on the one or more tunnels again.

In this embodiment of this application, after the UP device stops performing tunnel keepalive on the one or more tunnels, the method further includes: the UP device receives second tunnel information sent by the CP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers; and the UP device updates locally stored tunnel information based on the second tunnel information. That is, after tunnel failure recovery or session failure recovery is completed between the CP device and the remote network device, tunnel information is synchronized to the UP device again, to ensure that tunnel information stored in the UP device is consistent with that stored in the CP device, to prepare for a subsequent failure occurring again in communication between the UP device and the CP device.

Optionally, the second tunnel information is carried in a PFCP update request packet. In other words, in this embodiment of this application, the PFCP is also extended to obtain the PFCP update request packet carrying the second tunnel information.

According to a second aspect, a tunnel keepalive method is provided, where a control plane CP device and a user plane UP device are used to interact with a remote network device to ensure that a terminal accesses a network, and the method includes: the CP device sends first tunnel information to the UP device, where the first tunnel information includes information about one or more tunnels established between the UP device and the remote network device; and the CP device stops performing tunnel keepalive on the one or more tunnels if the CP device detects that communication between the CP device and the UP device fails; where the first tunnel information is used by the UP device to perform, based on the first tunnel information when the UP device detects that communication between the UP device and the CP device fails, tunnel keepalive on the one or more tunnels established between the UP device and the remote network device.

In the embodiments of this application, before a failure occurs in communication between the UP device and the CP device, the CP device synchronizes tunnel information to the UP device. After a failure occurs in communication between the UP device and the CP device, the UP device performs tunnel keepalive based on the tunnel information, that is, the UP device maintains a tunnel between the UP device and the remote network device. In this way, tunnel teardown is not triggered because of the failure in communication between the CP device and the UP device. This solution can ensure that a network connection between a terminal and a remote end is not interrupted, that is, a user service is not affected.

It should be noted that, for an implementation in which the UP device performs tunnel keepalive based on the tunnel information, refer to the tunnel keepalive method provided in the first aspect. Details are not described herein again.

In this embodiment of this application, before the failure occurs in communication between the UP device and the CP device, the CP device sends the first tunnel information to the UP device in a plurality of implementations. The following describes two implementations.

First implementation: The CP device synchronizes the first tunnel information to the UP device in an instant manner.

That is, each time the CP device creates a tunnel, the CP device sends information about the created tunnel to the UP device, and each time the CP device deletes a tunnel, the CP device sends information about the deleted tunnel to the UP device.

Optionally, the first tunnel information is carried in a PFCP update request packet, the one or more tunnels are L2TP tunnels, and information about each tunnel in the one or more tunnels includes tunnel description information. If the L2TP tunnel is created according to IPv4, the tunnel description information includes a local tunnel identifier, a remote tunnel identifier, a local tunnel IPv4 address, and a remote tunnel IPv4 address. If the L2TP tunnel is created according to IPv6, the tunnel description information includes a local tunnel identifier, a remote tunnel identifier, a local tunnel IPv6 address, and a remote tunnel IPv6 address.

In this embodiment of this application, when communication between the UP device and the CP device is normal, the CP device can further synchronize first session information to the UP device, and the UP device receives the first session information sent by the CP device. The first session information includes information about a session carried on the one or more tunnels.

In the first implementation, each time the CP device creates a session, the CP device synchronizes information about the created session to the UP device, and each time the CP device deletes a session, the CP device synchronizes information about the deleted session to the UP device.

Optionally, the first session information is carried in a PFCP update request packet, and the information about the session carried on each of the one or more tunnels includes a local tunnel identifier, a local session identifier, and a remote session identifier.

In the first implementation in which the CP device synchronizes information to the UP device, the first tunnel information and the first session information are carried in different PFCP update request packets respectively, and one PFCP update request packet carries information about a created tunnel, or information about a deleted tunnel, or information about a created session, or information about a deleted session. Real-time information synchronization ensures information timeliness and tunnel keepalive reliability.

Second implementation: The CP device periodically synchronizes the first tunnel information to the UP device.

That is, the CP device synchronizes information about all established tunnels stored in the CP device to the UP device at intervals of one synchronization periodicity. Alternatively, the CP device synchronizes updated tunnel information to the UP device at intervals of one synchronization periodicity, where the updated tunnel information includes information about a tunnel that is established or deleted after last tunnel information synchronization.

In the second implementation, the CP device can further periodically synchronize the first session information to the UP device. That is, in this embodiment of this application, before the CP device stops tunnel keepalive, the method further includes: the CP device sends the first session information to the UP device, where the first session information includes information about a session carried on the one or more tunnels.

Optionally, the first tunnel information and the first session information are carried in a PFCP update request packet. For related descriptions of the PFCP update request packet, refer to the foregoing related descriptions. Details are not described herein again. It should be noted that in the second implementation, the first tunnel information and the first session information may be carried in a same PFCP update request packet, or may be carried in different PFCP update request packets.

Optionally, the first session information is carried in a PFCP update request packet, and the information about the session carried on each of the one or more tunnels includes a local tunnel identifier, a local session identifier, and a remote session identifier.

It should be noted that for detailed descriptions of the first tunnel information and the first session information, refer to related content in the first aspect. Details are not described herein again.

Optionally, the CP device communicates with the UP device through a control packet redirection interface and a state control interface. That the CP device detects that communication between the CP device and the UP device fails includes: the CP device monitors statuses of the control packet redirection interface and the state control interface; and if the CP device detects that the status of the control packet redirection interface and/or the status of the state control interface are/is abnormal, the UP device determines that a failure is detected in communication between the UP device and the UP device.

In this embodiment of this application, if the CP device detects that the communication between the CP device and the UP device fails, after the CP device stops performing tunnel keepalive on the one or more tunnels, the method further includes: if the CP device detects that the communication between the CP device and the UP device is recovered, the CP device performs tunnel keepalive on the one or more tunnels again. That is, in a case in which communication between the CP device and the UP device is normal, the CP device still performs tunnel keepalive, so as to reduce load pressure of the UP device.

In this embodiment of this application, that the CP device performs tunnel keepalive on the one or more tunnels again includes: the CP device resets locally stored tunnel keepalive sequence numbers of a target tunnel, where the target tunnel is one of the one or more tunnels; the CP device indicates, based on the reset tunnel keepalive sequence numbers of the target tunnel, the remote network device to reset the tunnel keepalive sequence numbers of the target tunnel; after the remote network device successfully resets the tunnel keepalive sequence numbers of the target tunnel, the CP device performs tunnel keepalive on the target tunnel through the UP device based on the reset tunnel keepalive sequence numbers of the target tunnel and an identifier of the target tunnel.

Optionally, that the CP device indicates, based on the reset tunnel keepalive sequence numbers of the target tunnel, the remote network device to reset the tunnel keepalive sequence numbers of the target tunnel includes: the CP device sends a second control request packet to the remote network device through the UP device, where the second control request packet carries the identifier of the target tunnel, the reset tunnel keepalive sequence numbers of the target tunnel, and sequence number reset indication information; and the CP device receives, through the UP device, a second control reply packet sent by the remote network device, where the second control reply packet is used to indicate that the remote network device successfully resets the tunnel keepalive sequence numbers of the target tunnel.

It should be noted that, in a process in which the UP device and the remote network device perform tunnel keepalive, the remote network device may tear down some tunnels, and tunnel-related data reconciliation is performed on the tunnel between the UP device and the remote network device through tunnel failure recovery between the CP device and the remote network device, to clear a tunnel that has been removed and that is stored on the CP, so as to ensure tunnel consistency between the CP device and the remote network device and ensure accuracy of tunnel keepalive performed by the UP device.

To be specific, before the CP device resets the locally stored tunnel keepalive sequence numbers of the target tunnel, the method further includes: the CP device creates a data reconciliation tunnel between the CP device and the remote network device; the CP device sends, by using the UP device, a second data reconciliation packet to the remote network device through the data reconciliation tunnel, where the second data reconciliation packet carries an identifier of a tunnel established between the UP device and the remote network device that is stored in the CP device; the CP device receives, through the UP device, a second reconciliation reply packet sent by the remote network device, where the second reconciliation reply packet carries an identifier of a tunnel established between the remote network device and the UP device that is stored in the remote network device; and the CP device determines an intersection set of the tunnel identifier carried in the second data reconciliation packet and the tunnel identifier carried in the second reconciliation reply packet as identifiers of the one or more tunnels.

It should be noted that, for a process in which the CP device performs data reconciliation and resets the tunnel keepalive sequence numbers, refer to related content of the foregoing UP device. Details are not described herein again.

In this embodiment of this application, after performing failure recovery on the target tunnel by using the UP device, the CP device can further update, by using the UP device, locally stored information about a session carried on the target tunnel, to perform failure recovery on the session carried on the target tunnel.

To be specific, after the CP device creates the data reconciliation tunnel between the CP device and the remote network device, the method further includes: the CP device sends a second session data reconciliation packet to the remote network device through the UP device, where the second session data reconciliation packet carries identifiers of one or more first reference sessions, and the one or more first reference sessions are sessions carried on the target tunnel that are stored in the CP device; the CP device receives, through the UP device, a second session reconciliation reply packet sent by the remote network device, where the second session reconciliation reply packet carries identifiers of one or more third reference sessions, and the one or more third reference sessions are sessions carried on the target tunnel that are stored in the remote network device; and the CP device determines an intersection set of the identifiers of the one or more first reference sessions and the identifiers of the one or more third reference sessions as an identifier of a session carried on the target tunnel. In other words, the CP device updates, by using the UP device, the information that is stored in the CP device and that is about the session carried on the target tunnel, to perform failure recovery on the session carried on the target tunnel.

It should be noted that, in a process in which the UP device and the remote network device perform tunnel keepalive, the remote network device may also tear down sessions on some tunnels. Session-related data reconciliation is performed on the session between the UP device and the remote network device through session failure recovery between the CP device and the remote network device, that is, the torn-down sessions stored in the CP are cleared, to ensure session consistency between the CP device and the remote network device.

In addition, for a tunnel other than the target tunnel in the one or more tunnels, the CP device can perform tunnel failure recovery and session failure recovery according to a failure recovery method the same as that for the target tunnel. Details are not described in this embodiment of this application.

In this embodiment of this application, after the CP device performs failure recovery on the target tunnel based on the reset tunnel keepalive sequence numbers of the target tunnel by using the UP device, the method further includes: The CP device sends second tunnel information to the UP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers. That is, the CP device synchronizes tunnel information to the UP device again, so that the UP device performs tunnel keepalive when a failure occurs again in communication between the UP device and the CP device.

Optionally, the second tunnel information is carried in a PFCP update request packet.

In this embodiment of this application, after the CP device performs failure recovery on the session on the target tunnel by using the UP device, the method further includes: the CP device sends second session information to the UP device, where the second session information includes information that is stored in the CP device at a second moment and that is about a session carried on the one or more tunnels established between the UP device and the remote network device. In other words, the CP device synchronizes session information to the UP device again, so that the UP device performs tunnel keepalive and implements session communication of the terminal in case a failure occurs again in subsequent communication between the UP device and the CP device.

Optionally, the second session information is carried in a PFCP update request packet.

Optionally, the second tunnel information and the second session information are carried in one PFCP update request packet or different PFCP update request packets.

Optionally, in this embodiment of this application, after sending, to the UP device, the PFCP update request packet that carries the second tunnel information and/or the second session information, the CP device receives a PFCP update reply packet sent by the UP device.

In this embodiment of this application, after performing tunnel failure recovery and session failure recovery with the remote network device, the CP device continues to synchronize latest tunnel information and session information to the UP device in an instant manner or a periodic manner after synchronizing tunnel information and session information to the UP device once, to prepare for a subsequent failure occurring again in communication between the UP device and the CP device.

According to a third aspect, a network device is provided. The network device has a function of implementing a behavior of the tunnel keepalive method in the first aspect. The network device includes one or more modules, and the one or more modules are configured to implement the tunnel keepalive method provided in the first aspect.

In other words, a network device is provided. The network device is applied to a network system, the network system includes a CP device and a UP device, the CP device and the UP device are used to interact with a remote network device to ensure that a terminal accesses a network, the network device is the UP device, and the network device includes: a first receiving module, configured to receive first tunnel information sent by the CP device, where the first tunnel information includes information about one or more tunnels established between the UP device and the remote network device; and a tunnel keepalive module, configured to: if it is detected that communication between the UP device and the CP device fails, perform tunnel keepalive on the one or more tunnels based on the first tunnel information.

Optionally, the first tunnel information includes identifiers of the one or more tunnels.

The tunnel keepalive module includes: a monitoring unit, configured to monitor a first tunnel keepalive packet sent by the remote network device, where the first tunnel keepalive packet carries an identifier and tunnel keepalive sequence numbers of a target tunnel; and a first sending unit, configured to send a second tunnel keepalive packet to the remote network device based on the identifier and the tunnel keepalive sequence numbers of the target tunnel, and the identifiers of the one or more tunnels.

Optionally, the first tunnel information includes identifiers of the one or more tunnels.

The tunnel keepalive module includes: a resetting unit, configured to reset tunnel keepalive sequence numbers of a target tunnel, where the target tunnel is one of the one or more tunnels; an indication unit, configured to indicate, based on the reset tunnel keepalive sequence numbers of the target tunnel, the remote network device to reset the tunnel keepalive sequence numbers of the target tunnel; and a tunnel keepalive unit, configured to: after the remote network device successfully resets the tunnel keepalive sequence numbers of the target tunnel, perform tunnel keepalive on the target tunnel based on the reset tunnel keepalive sequence numbers of the target tunnel and an identifier of the target tunnel.

Optionally, the indication unit is specifically configured to: send a first control request packet to the remote network device, where the first control request packet carries the identifier of the target tunnel, the reset tunnel keepalive sequence numbers of the target tunnel, and sequence number reset indication information; and receive a first control reply packet sent by the remote network device, where the first control reply packet is used to indicate that the remote network device successfully resets the tunnel keepalive sequence numbers of the target tunnel.

Optionally, the tunnel keepalive module further includes: a creation unit, configured to create a data reconciliation tunnel to the remote network device; a second sending unit, configured to send a first tunnel data reconciliation packet to the remote network device through the data reconciliation tunnel, where the first tunnel data reconciliation packet carries an identifier of a tunnel established between the UP device and the remote network device that is stored in the UP device; a first receiving unit, configured to receive a first tunnel reconciliation reply packet sent by the remote network device, where the first tunnel reconciliation reply packet carries an identifier of a tunnel established between the remote network device and the UP device that is stored in the remote network device; and a first determining unit, configured to determine an intersection set of the tunnel identifier carried in the first tunnel data reconciliation packet and the tunnel identifier carried in the first tunnel reconciliation reply packet as the identifiers of the one or more tunnels.

Optionally, the network device further includes: a second receiving module, configured to receive first session information sent by the CP device, where the first session information includes information about a session carried on the one or more tunnels.

The tunnel keepalive module further includes: a third sending unit, configured to send a first session data reconciliation packet to the remote network device, where the first session data reconciliation packet carries identifiers of one or more first reference sessions, and the one or more first reference sessions are sessions carried on the target tunnel that are stored in the UP device; a second receiving unit, configured to receive a first session reconciliation reply packet sent by the remote network device, where the first session reconciliation reply packet carries identifiers of one or more second reference sessions, and the one or more second reference sessions are sessions carried on the target tunnel that are stored in the remote network device; and a second determining unit, configured to determine an intersection set of the identifiers of the one or more first reference sessions and the identifiers of the one or more second reference sessions as an identifier of a session carried on the target tunnel.

Optionally, the network device further includes: a processing module, configured to: if it is detected that communication between the UP device and the CP device is recovered, stop performing tunnel keepalive on the one or more tunnels.

Optionally, the network device further includes: a third receiving module, configured to receive second tunnel information sent by the CP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers; and an updating module, configured to update locally stored tunnel information based on the second tunnel information.

Optionally, the UP device communicates with the CP device by using a control packet redirection interface and a state control interface.

The tunnel keepalive module includes: a monitoring unit, configured to monitor statuses of the control packet redirection interface and the state control interface; and a third determining unit, configured to: if it is detected that the status of the control packet redirection interface and/or the status of the state control interface are/is abnormal, determine that a failure is detected in communication between the UP device and the CP device.

Optionally, the first tunnel information is carried in a PFCP update request packet, the one or more tunnels are L2TP tunnels, and information about each of the one or more tunnels includes tunnel description information.

If the L2TP tunnel is created according to IPv4, the tunnel description information includes a local tunnel identifier, a remote tunnel identifier, a local tunnel IPv4 address, and a remote tunnel IPv4 address.

If the L2TP tunnel is created according to IPv6, the tunnel description information includes a local tunnel identifier, a remote tunnel identifier, a local tunnel IPv6 address, and a remote tunnel IPv6 address.

Optionally, the second tunnel information is carried in a PFCP update request packet.

Optionally, the first session information is carried in a PFCP update request packet, and the information about the session carried on each of the one or more tunnels includes a local tunnel identifier, a local session identifier, and a remote session identifier.

According to a fourth aspect, a network device is provided. The network device has a function of implementing a behavior of the tunnel keepalive method in the second aspect. The network device includes one or more modules, and the one or more modules are configured to implement the tunnel keepalive method provided in the second aspect.

In other words, a network device is provided. The network device is applied to a network system, the network system includes a CP device and a UP device, the CP device and the UP device are used to interact with a remote network device to ensure that a terminal accesses a network, the network device is the CP device, and the network device includes: a first sending module, configured to send first tunnel information to the UP device, where the first tunnel information includes information about one or more tunnels established between the UP device and the remote network device; and a processing module, configured to stop performing tunnel keepalive on the one or more tunnels if it is detected that communication between the CP device and the UP device fails.

The first tunnel information is used to indicate the UP device to perform, when detecting that a failure occurs in communication between the UP device and the CP device, tunnel keepalive on the one or more tunnels established between the UP device and the remote network device.

Optionally, the network device further includes: a tunnel keepalive module, configured to: if it is detected that communication between the CP device and the UP device is recovered, perform tunnel keepalive on the one or more tunnels again.

Optionally, the tunnel keepalive module includes: a resetting unit, configured to reset locally stored tunnel keepalive sequence numbers of a target tunnel, where the target tunnel is one of the one or more tunnels; an indication unit, configured to indicate, based on the reset tunnel keepalive sequence numbers of the target tunnel, the remote network device to reset the tunnel keepalive sequence numbers of the target tunnel; and a tunnel keepalive unit, configured to: after the remote network device successfully resets the tunnel keepalive sequence numbers of the target tunnel, perform tunnel keepalive on the target tunnel by using the UP device based on the reset tunnel keepalive sequence numbers of the target tunnel and an identifier of the target tunnel.

Optionally, the indication unit is specifically configured to: send a second control request packet to the remote network device through the UP device, where the second control request packet carries the identifier of the target tunnel, the reset tunnel keepalive sequence numbers of the target tunnel, and sequence number reset indication information; and receive, through the UP device, a second control reply packet sent by the remote network device, where the second control reply packet is used to indicate that the remote network device successfully resets the tunnel keepalive sequence numbers of the target tunnel.

Optionally, the tunnel keepalive module further includes: a creation unit, configured to create a data reconciliation tunnel to the remote network device; a first sending unit, configured to send, by using the UP device, a second data reconciliation packet to the remote network device through the data reconciliation tunnel, where the second data reconciliation packet carries an identifier of a tunnel established between the UP device and the remote network device that is stored in the CP device; a first receiving unit, configured to receive, through the UP device, a second reconciliation reply packet sent by the remote network device, where the second reconciliation reply packet carries an identifier of a tunnel established between the remote network device and the UP device that is stored in the remote network device; and a first determining unit, configured to determine an intersection set of the tunnel identifier carried in the second data reconciliation packet and the tunnel identifier carried in the second reconciliation reply packet as identifiers of the one or more tunnels.

Optionally, the tunnel keepalive module further includes: a second sending unit, configured to send a second session data reconciliation packet to the remote network device through the UP device, where the second session data reconciliation packet carries identifiers of one or more first reference sessions, and the one or more first reference sessions are sessions carried on the target tunnel that are stored in the CP device; a second receiving unit, configured to receive, through the UP device, a second session reconciliation reply packet sent by the remote network device, where the second session reconciliation reply packet carries identifiers of one or more third reference sessions, and the one or more third reference sessions are sessions carried on the target tunnel that are stored in the remote network device; and a second determining unit, configured to determine an intersection set of the identifiers of the one or more first reference sessions and the identifiers of the one or more third reference sessions as an identifier of a session carried on the target tunnel.

Optionally, the tunnel keepalive module further includes: a third sending unit, configured to send second tunnel information to the UP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers.

Optionally, the CP device communicates with the UP device by using a control packet redirection interface and a state control interface.

The processing module includes: a monitoring unit, configured to monitor statuses of the control packet redirection interface and the state control interface; and a third determining unit, configured to: if it is detected that the status of the control packet redirection interface and/or the status of the state control interface are/is abnormal, determine that a failure is detected in communication between the CP device and the UP device.

Optionally, the first tunnel information is carried in a PFCP update request packet, the one or more tunnels are layer 2 tunnel protocol L2TP tunnels, and information about each of the one or more tunnels includes tunnel description information.

If the L2TP tunnel is created according to IPv4, the tunnel description information includes a local tunnel identifier, a remote tunnel identifier, a local tunnel IPv4 address, and a remote tunnel IPv4 address.

If the L2TP tunnel is created according to IPv6, the tunnel description information includes a local tunnel identifier, a remote tunnel identifier, a local tunnel IPv6 address, and a remote tunnel IPv6 address.

Optionally, the second tunnel information is carried in a PFCP update request packet.

Optionally, the network device further includes: a fourth sending module, configured to send first session information to the UP device, where the first session information includes information about a session carried on the one or more tunnels.

Optionally, the first session information is carried in a PFCP update request packet, and the information about the session carried on each of the one or more tunnels includes a local tunnel identifier, a local session identifier, and a remote session identifier.

Optionally, the first sending module includes: a fifth sending unit, configured to: each time a tunnel is created, send information about the created tunnel to the UP device, where the one or more tunnels include the created tunnel; or a sixth sending unit, configured to periodically send locally stored tunnel information to the UP device.

According to a fifth aspect, a network device is provided. The network device is applied to a network system, the network system includes a UP device and a CP device, and the CP device and the UP device are used to interact with a remote network device to ensure that a terminal accesses a network. The network device is the UP device. The network device includes a processor and a memory, and the memory is configured to store a program for performing the tunnel keepalive method provided in the first aspect, and store data used to implement the tunnel keepalive method provided in the first aspect. The processor is configured to execute the program stored in the memory. An operation apparatus of the storage device may further include a communication bus, and the communication bus is configured to establish a connection between the processor and the memory.

According to a sixth aspect, a network device is provided. The network device is applied to a network system, the network system includes a UP device and a CP device, and the CP device and the UP device are used to interact with a remote network device to ensure that a terminal accesses a network. The network device is the CP device. The network device includes a processor and a memory, and the memory is configured to store a program for performing the tunnel keepalive method provided in the second aspect, and store data used to implement the tunnel keepalive method provided in the second aspect. The processor is configured to execute the program stored in the memory. An operation apparatus of the storage device may further include a communication bus, and the communication bus is configured to establish a connection between the processor and the memory.

According to a seventh aspect, a network system is provided, where the system includes a CP device, a UP device, and a remote network device, and the CP device and the UP device are used to interact with the remote network device, to ensure that a terminal accesses a network.

The UP device is configured to implement the tunnel keepalive method provided in the first aspect.

The CP device is configured to implement the tunnel keepalive method provided in the second aspect.

According to an eighth aspect, a computer-readable storage medium is provided. The computer-readable storage medium stores instructions. When the instructions are run on a computer, the computer is enabled to perform the tunnel keepalive method according to the first aspect or the second aspect.

According to a ninth aspect, a computer program product including instructions is provided. When the computer program product is run on a computer, the computer is enabled to perform the tunnel keepalive method according to the first aspect or the second aspect.

Technical effects achieved in the third aspect, the fourth aspect, the fifth aspect, the sixth aspect, the seventh aspect, the eighth aspect, and the ninth aspect are similar to technical effects obtained by corresponding technical means in the first aspect or the second aspect. Details are not described herein again.

The technical solutions provided in the embodiments of this application can bring at least the following beneficial effects:

In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device. This solution can ensure that a network connection between a terminal and a remote end is not interrupted, that is, a user service is not affected.

BRIEF DESCRIPTION OF THE DRAWINGS

FIG. 2 is a schematic diagram of a structure of a network device according to an embodiment of this application;

FIG. 3 is a flowchart of a tunnel keepalive method according to an embodiment of this application;

FIG. 4A and FIG. 4B are a flowchart of another tunnel keepalive method according to an embodiment of this application;

DETAILED DESCRIPTION OF ILLUSTRATIVE EMBODIMENTS

To make the objectives, technical solutions, and advantages of this application clearer, the following further describes the implementations of the embodiments of this application in detail with reference to the accompanying drawings.

A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

Figure 1:
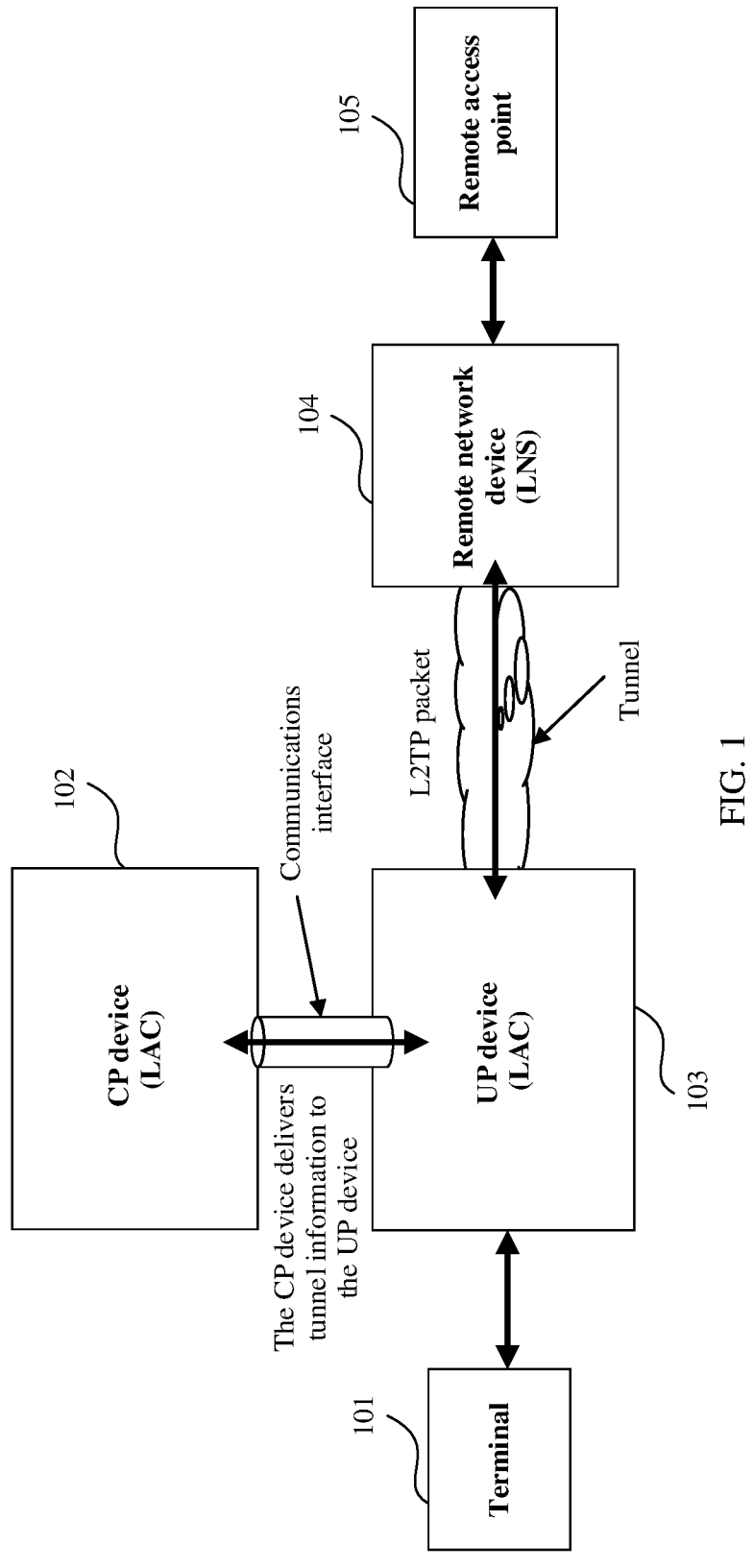
FIG. 1 is a diagram of a system architecture related to a tunnel keepalive method according to an embodiment of this application.

FIG. 1 is a diagram of a system architecture related to a tunnel keepalive method according to an embodiment of this application. As shown in FIG. 1, the system architecture includes a terminal 101, a CP device 102, a UP device 103, a remote network device 104, and a remote access point 105. A communication connection is established between the terminal 101 and the UP device 103, a communication connection is established between the UP device 103 and the remote network device 104, a communication connection is established between the CP device 102 and the UP device 103, and a communication connection is established between the remote network device 104 and the remote access point 105.

In this embodiment of this application, the local CP device 102 and UP device 103 are used as two parts of a vBNG to jointly implement an LAC function. The remote network device 104 implements an LNS function. The local CP device 102 can establish a tunnel and a session between the UP device 103 and the remote network device 104, to ensure that the terminal 101 successfully accesses a network provided by the remote access point 105 and implements service communication. Tunnel keepalive needs to be performed on the tunnel between the UP device 103 and the remote network device 104, to ensure that a user service is not interrupted.

When no failure occurs in communication between the UP device 103 and the CP device 102, the CP device 102 is used to establish a tunnel between the UP device 103 and the remote network device 104 and set up a session carried on the tunnel, to connect the terminal 101 to a remote network, and the CP device 102 performs, by using the UP device 103, tunnel keepalive on the tunnel established between the UP device 103 and the remote network device 104, to ensure that a user service is not interrupted. The UP device 103 is further used to transmit a data packet between the terminal 101 and the remote network device 104 on the session carried by the tunnel, to implement service communication between the terminal 101 and the remote network device 104. In other words, the CP device 102 and the UP device 103 are used to interact with the remote network device 104 to ensure that the terminal 101 accesses the network. In addition, the CP device 102 is further used to synchronize tunnel information and session information to the UP device 103 according to the tunnel keepalive method provided in embodiments of this application.

When communication between the UP device 103 and the CP device 102 fails, the CP device 102 cannot continue to interact, through the UP device 103, with the remote network device 104 for tunnel keepalive. In this case, the UP device 103 performs tunnel keepalive on the tunnel between the UP device 103 and the remote network device 104 based on the stored tunnel information, to ensure that the tunnel is not torn down due to the failure in communication between the UP device 103 and the CP device 102, so as to maintain the tunnel and ensure that the session carried on the tunnel is not interrupted.

After communication between the UP device 103 and the CP device 102 is recovered, the UP device 103 stops tunnel keepalive, the CP device 102 continues to perform tunnel keepalive with the remote network device 104 by using the UP device 103, and the CP device 102 synchronizes tunnel information stored in a process of performing tunnel keepalive between the CP device 102 and the remote network device 104 to the UP device 103.

It should be noted that the system architecture includes a plurality of terminals, and a remote network device and a remote access point that correspond to each terminal. The foregoing merely uses one terminal, one corresponding remote network device, and one corresponding remote access point as an example for description. For each terminal, the CP device and the UP device can implement the foregoing functions.

Optionally, the remote network device 104 is a conventional BNG device, that is, the remote network device 104 is an independent gateway device. Alternatively, the remote network device 104 is implemented by using a vBNG, that is, includes a CP device and a UP device. In this case, for ease of description, the local CP device 102 and the local UP device 103 are referred to as a CP-LAC and an UP-LAC respectively, and the remote CP device and the remote UP device are referred to as a CP-LNS and an UP-LNS respectively. The CP-LAC is in a communication connection to the UP-LAC, the UP-LAC is in a communication connection to the UP-LNS, and the UP-LNS is in a communication connection to the CP-LNS.

Optionally, a virtual broadband remote access server (vBRAS) can implement the same function as the vBNG, that is, the vBRAS includes a CP device and a UP device.

The CP device and the UP device are used to enable a local terminal to access a remote network, and implement tunnel keepalive according to the tunnel keepalive method provided in embodiments of this application.

In embodiments of this application, the terminal 101 is a device such as a mobile phone, a computer, or a home gateway. The UP device 103 is a device such as a router or a switch. The CP device 102 is a server, or a server cluster including a plurality of servers, or a cloud computing service center. The remote network device 104 is an independent device such as a router or a switch. Alternatively, the remote network device 104 includes one UP device and one CP device. The remote access point 105 is a device that provides a broadband network.

FIG. 2 is a schematic diagram of a structure of a network device according to an embodiment of this application. Optionally, the network device is the CP device or the UP device shown in FIG. 1, and the network device includes one or more processors 201, a communications bus 202, a memory 203, and one or more communications interfaces 204.

The processor 201 is a general purpose central processing unit (CPU), a network processor (NP), a microprocessor, or one or more integrated circuits configured to implement the solutions of this application, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communications bus 202 is used to transmit information between the foregoing components. Optionally, the communications bus 202 may be classified as an address bus, a data bus, a control bus, and the like. For ease of representation, only one thick line is used to represent the bus in the figure, but this does not mean that there is only one bus or only one type of bus.

Optionally, the memory 203 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 203 exists independently, and is connected to the processor 201 through the communications bus 202, or the memory 203 is integrated with the processor 201.

The communications interface 204 is configured to communicate with another device or a communications network by using any apparatus such as a transceiver. The communications interface 204 includes a wired communications interface, or may optionally include a wireless communications interface. The wired communications interface is, for example, an Ethernet interface. Optionally, the Ethernet interface is an optical interface, an electrical interface, or a combination thereof. The wireless communications interface is a wireless local area network (WLAN) interface, a cellular network communications interface, a combination thereof, or the like. When the network device is the CP device, the communications interface 204 is configured to communicate with the UP device. When the network device is the UP device, the communications interface 204 is configured to communicate with the CP device.

Optionally, in some embodiments, the network device includes a plurality of processors, such as the processor 201 and a processor 205 shown in FIG. 2. Each of the processors is a single-core processor, or is a multi-core processor. Optionally, the processor herein is one or more devices, circuits, and/or processing cores for processing data (such as computer program instructions).

During specific implementation, in an embodiment, the network device may further include an output device 206 and an input device 207. The output device 206 communicates with the processor 201, and may display information in a plurality of manners. For example, the output device 206 is a liquid crystal display (LCD), a light emitting diode (LED) display device, a cathode ray tube (CRT) display device, or a projector. The input device 207 communicates with the processor 201, and may receive an input from a user in a plurality of manners. For example, the input device 207 is a mouse, a keyboard, a touchscreen device, or a sensing device.

In some embodiments, the memory 203 is configured to store program code 210 for executing the solutions of this application, and the processor 201 may execute the program code 210 stored in the memory 203. The program code includes one or more software modules, and the network device can implement, by using the processor 201 and the program code 210 in the memory 203, a tunnel keepalive method provided in the following embodiment in FIG. 3.

When the network device is the UP device, the memory 203 is configured to store the program code 210, and the processor 201 is configured to execute the program code 210 stored in the memory 203, to implement corresponding functions of the UP device in the tunnel keepalive method provided in the embodiments of this application. That is, first tunnel information sent by the CP device is received, and if it is detected that communication between the UP device and the CP device fails, tunnel keepalive is performed based on the first tunnel information. For a specific implementation, refer to detailed descriptions in the following embodiment in FIG. 3. Details are not described herein again.

Figures 5, 6:
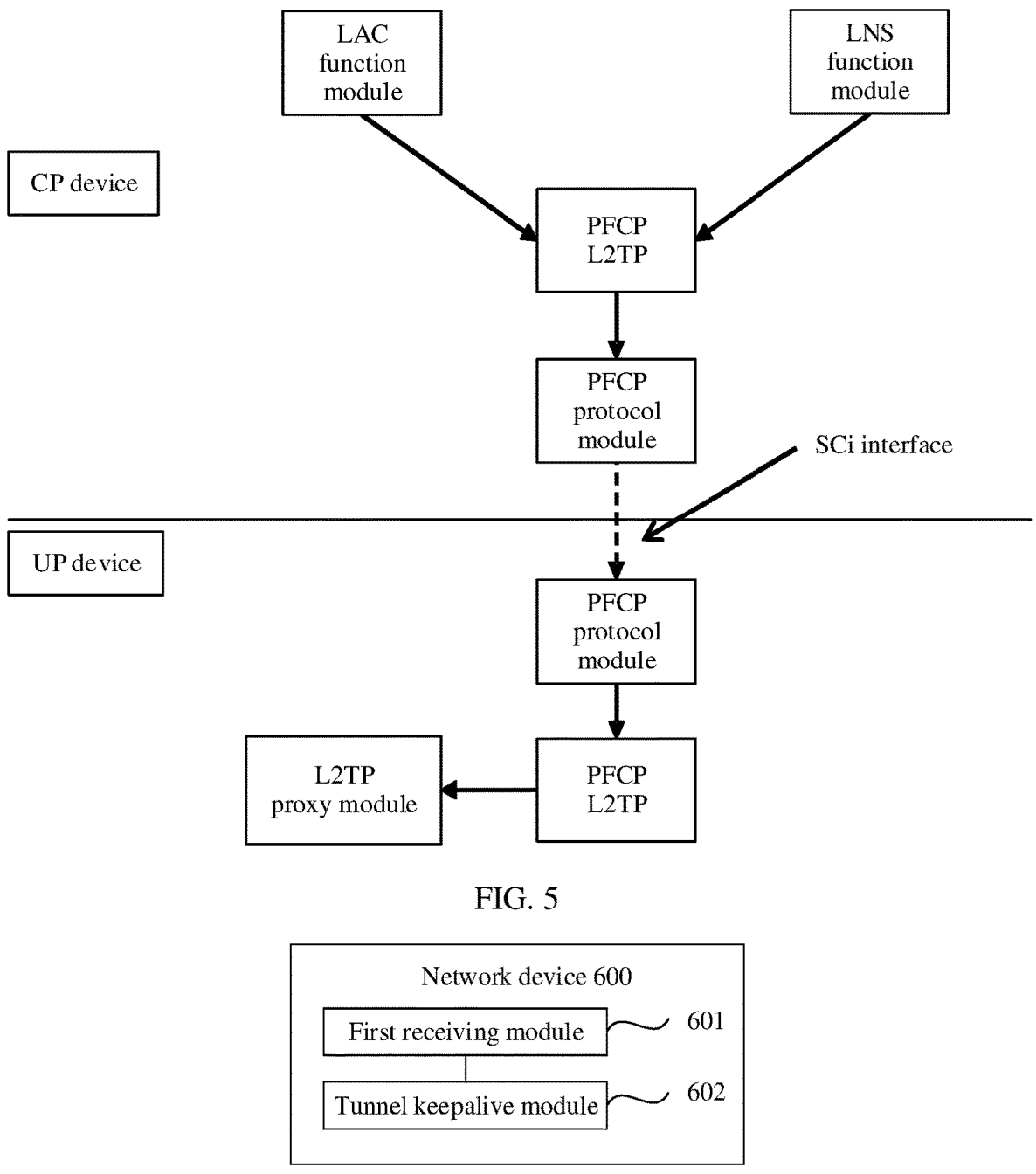
FIG. 5 is a schematic diagram of communication between modules included in a CP device and a UP device according to an embodiment of this application.
FIG. 6 is a schematic diagram of a structure of a network device according to an embodiment of this application.

For example, when a first receiving module 601 and a tunnel keepalive module 602 in the embodiment shown in FIG. 6 are implemented by using software, the program code 210 may include a first receiving module and a tunnel keepalive module. The first receiving module is configured to receive the first tunnel information sent by the CP device, and the tunnel keepalive module is configured to perform tunnel keepalive based on the first tunnel information.

When the network device is the CP device, the memory 203 is configured to store the program code 210, and the processor 201 is configured to execute the program code 210 stored in the memory 203, to implement corresponding functions of the CP device in the tunnel keepalive method provided in the embodiments of this application. That is, first tunnel information is sent to the UP device, and if it is detected that communication between the CP device and the UP device fails, tunnel keepalive is stopped. For a specific implementation, refer to detailed descriptions in the following embodiment in FIG. 3. Details are not described herein again.

Figure 8:
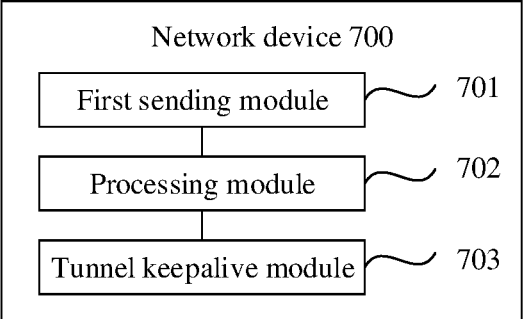
FIG. 8 is a schematic diagram of a structure of still another network device according to an embodiment of this application.

For example, when a first sending module 701, a processing module 702, and a tunnel keepalive module 703 in the embodiment shown in FIG. 8 are implemented by using software, the program code 210 may include a first sending module, a processing module, and a tunnel keepalive module. The first sending module is configured to send first tunnel information to the UP device, the processing module is configured to stop tunnel keepalive after detecting that communication between the CP device and the UP device fails, and the tunnel keepalive module is configured to perform tunnel keepalive again when detecting that communication between the CP device and the UP device is recovered.

FIG. 3 is a flowchart of a tunnel keepalive method according to an embodiment of this application. Refer to FIG. 3. The method includes the following steps.

Step 301: A UP device receives first tunnel information sent by a CP device, where the first tunnel information includes information about one or more tunnels established between the UP device and a remote network device.

In this embodiment of this application, the CP device and the UP device are used to interact with the remote network device to ensure that a terminal accesses a network. For example, in a scenario in which a terminal accesses a remote headquarters intranet by using a broadband dial-up connection, the terminal can establish a communication connection by using channels established between a local CP device and a remote network device and between a local UP device and the remote network device. For example, the CP device establishes a tunnel between the UP device and the remote network device and sets up a session carried on the tunnel, to ensure that the terminal accesses the remote network and implement service communication.

In this embodiment of this application, when no failure occurs in communication between the UP device and the CP device, the terminal can send a connection request to the UP device, to request to access a network provided by a remote access point managed by the remote network device. The UP device forwards the connection request to the CP device. The CP device performs user authentication on the connection request, to determine the remote network device corresponding to the network that the terminal requests to access. After the user authentication succeeds, the CP device establishes a tunnel between the UP device and the remote network device and sets up a session carried on the tunnel. The terminal is successfully connected to the network by using the session on the tunnel, and service communication is implemented.

For example, a terminal in a lottery station wants to access a network of a lottery center in an enterprise headquarters. The terminal sends a connection request to a UP device included in a vBNG of a local operator through broadband dialing. A CP device performs user authentication based on the connection request, and determines a remote network device corresponding to the network of the lottery center that the terminal requests to access. After the user authentication succeeds, the CP device establishes a tunnel between the UP device and the remote network device and sets up a session carried on the tunnel, and the terminal is successfully connected to the network of the lottery center through the session.

After the terminal successfully accesses the network, the terminal implements service communication by using the session carried on the tunnel maintained between the UP device and the remote network device. In addition, the CP device performs tunnel keepalive on the tunnel between the UP device and the remote network device by exchanging a tunnel keepalive packet between the UP device and the remote network device, that is, maintains the tunnel between the UP device and the remote network device, and ensures that the tunnel and the session carried on the tunnel are not interrupted, that is, ensures that the terminal service is not interrupted. The UP device forwards a data packet between the terminal and the remote network device, to ensure that service communication of the terminal is maintained on the session carried on the tunnel.

If communication between the CP device and the UP device is normal, the CP device can further synchronize tunnel information stored in the CP device to the UP device. In other words, in this embodiment of this application, the CP device sends the first tunnel information to the UP device, and the first tunnel information includes the information about the one or more tunnels established between the UP device and the remote network device. It should be noted that there are a plurality of implementations in which the CP device sends the first tunnel information to the UP device. The following exemplarily describes two of the implementations.

First implementation: The CP device synchronizes the first tunnel information to the UP device in an instant manner.

That is, each time the CP device creates a tunnel, the CP device sends information about the created tunnel to the UP device, and each time the CP device deletes a tunnel, the CP device sends information about the deleted tunnel to the UP device.

In this embodiment of this application, the first tunnel information is carried in a PFCP update request packet, the one or more tunnels are L2TP tunnels, and information about each of the one or more tunnels includes tunnel description information. If the L2TP tunnel is created according to IPv4, the tunnel description information includes a local tunnel identifier, a remote tunnel identifier, a local tunnel IPv4 address, and a remote tunnel IPv4 address. If the L2TP tunnel is created according to IPv6, the tunnel description information includes a local tunnel identifier, a remote tunnel identifier, a local tunnel IPv6 address, and a remote tunnel IPv6 address. The local tunnel identifier and the remote tunnel identifier are tunnel identifiers.

In this embodiment of this application, the first tunnel information may be carried in any communications protocol packet. Optionally, the PFCP protocol is extended to obtain the PFCP update request packet. Optionally, a node message (node message) specified in the PFCP is extended, to obtain the PFCP update request packet.

For example, Table 1 is a node message specified by extended PFCP. The PFCP update request packet further carries a message type. The message type may be any value from 16 to 49. The message type is used to indicate that a corresponding packet is a PFCP update request packet, which is also referred to as a PFCP L2TP tunnel update request.

TABLE 1

| Message type (message type) | |
|---|---|
| Value (decimal) | Message |
| 16 to 49 | PFCP L2TP tunnel update request |
| 16 to 49 | PFCP L2TP tunnel update reply |

In a PFCP node message, a PFCP update request packet includes a grouped information element (Grouped IE). A Grouped IE includes one or more embedded information elements Embedded IE. An Embedded IE is the smallest unit of a PFCP update request packet. Each Embedded IE carries one piece of tunnel description information. A PFCP update request packet is obtained by extending the Grouped IE.

In this embodiment of this application, as shown in Table 2, an identifier of an IE carried in the PFCP update request packet is first described, where M indicates a mandatory option, C indicates that the IE needs to be carried when a condition is met, CO indicates that the IE may be carried or not carried when a condition is met, and O indicates that the IE may be carried or not carried.

TABLE 2

| Classification of the IE in the service process | Description |
|---|---|
| mandatory (M) | mandatory option |
| conditional (C) | carried when a condition is met |
| conditional-optional (CO) | carried or not carried when a condition is met |
| optional (O) | carried or not carried |

Table 3 describes tunnel information carried in the PFCP update request packet. The PFCP update request packet further carries a device number of the CP device, that is, a node identification (Node ID) of the CP device. When an L2TP tunnel is created, the PFCP update request packet further carries tunnel description information of each created tunnel. When an L2TP tunnel is deleted, the PFCP update request packet further carries tunnel description information of each deleted tunnel.

TABLE 3

| Embedded IE | P | Condition/Content | IE type |
|---|---|---|---|
| Node ID | M | Device number of the CP | Node identification |
| Create an L2TP tunnel | C | Tunnel description information of the created tunnel, which may carry a plurality of IEs | create L2TP tunnel |
| Delete an L2TP tunnel | C | Tunnel description information of the deleted tunnel, which may carry a plurality of IEs | delete L2TP tunnel |

Optionally, if L2TP traverses a layer 3 virtual private network (L3VPN), the PFCP update request packet further carries a name of an L3VPN instance, that is, a private network name of the L3VPN.

For example, Table 4 describes a structure of a PFCP update request packet obtained by extending a Grouped IE. When an L2TP tunnel is created or deleted, the first two octets (one Octet is 8 bits, that is, one byte) of the PFCP update request packet carry a tunnel message type, the third and fourth octets carry length to indicate a packet length, and the fifth and sixth octets carry an enterprise ID to indicate which enterprise extends the packet. Starting from the seventh octet, tunnel description information of the created or deleted tunnel is carried. Optionally, if L2TP traverses an L3VPN, a name of an L3VPN instance is further carried.

TABLE 4

| Octets 1 and 2 | | Tunnel message type = XX (decimal) | |
|---|---|---|---|
| Octets 3 and 4 | | Length (length) = n | |
| Octets 5 and 6 | | Enterprise ID (enterprise ID) = XXX | |
| IEs | P | Condition/Content | IE type |
| L2TP tunnel endpoint | M | Tunnel description information of L2TP tunnel | L2TP tunnel endpoint |
| network instance | O | If L2TP traverses an L3VPN, a name of a VPN instance exists here | network instance |

Table 5 is a schematic diagram of a structure of a PFCP update request packet that carries tunnel description information and that is obtained by extending an Embedded IE.

TABLE 5

| Octets | Bits | | | | |
|---|---|---|---|---|---|
| | 8 7 | 6 5 4 3 | 2 | 1 | |
| 1 to 2 | message type = NN (decimal) | | | | |
| 3 to 4 | length = n | | | | |
| 5 to 6 | enterprise ID = XXX | | | | |
| 7 | spare | Ver | V6 | V4 | |
| 8 to 11 | local tunnel ID | | | | |
| 12 to 15 | remote tunnel ID | | | | |
| p to p + 3 | local IPv4 address | | | | |
| q to q + 3 | remote IPv4 address | | | | |
| r to r + 15 | local IPv6 address | | | | |
| s to (s + 15) | remote IPv6 address | | | | |

In Table 5, the tunnel description information starts from the octet 7. In bit 1 of the octet 7, a value of V4 is 1, indicating that the L2TP tunnel is attached to (over) an IPv4 address, that is, the L2TP tunnel is created according to IPv4. In this case, p=16 and q=20.

In bit 2 of the octet 7, a value of V6 is 1, indicating that the tunnel is over an IPv6 address, that is, the L2TP tunnel is created according to IPv6. In this case, r=16 and s=32.

In bits 3 to 6 of the octet 7, Ver (version) indicates a version number of the L2TP tunnel. The value of Ver being 2 indicates an L2TPV2 version. In this case, the tunnel identifier (tunnel ID) is a 16-bit unsigned integer. The value of Ver being 3 indicates an L2TPV3 version. In this case, the tunnel ID is a 32-bit unsigned integer.

Bits 7 and 8 of the octet 7 are reserved fields and are set to 0.

Octets 8 to 11: local tunnel identifier (local tunnel ID), 32-bit unsigned integer, L2TPV2 version (lower 16 bits are valid).

Octets 12 to 15: remote tunnel identifier (remote tunnel ID), 32-bit unsigned integer, L2TPV2 version (lower 16 bits are valid).

Octets p to p+3: local IPv4 address of the tunnel (local IPv4 address).

Octets q to q+3: remote IPv4 address of the tunnel (remote IPv4 address).

Octets r to r+15: local IPv6 address of the tunnel (local IPv6 address).

Octets s to s+15: remote IPv6 address of the tunnel (remote IPv6 address).

For example, if the version is L2TPV2, and an IPv4 address is used, a structure of the PFCP update request packet is shown in Table 6.

TABLE 6

| Octets | Bits | | | | |
|---|---|---|---|---|---|
| | 8 7 | 6 5 4 3 | 2 | 1 | |
| 1 to 2 | message type = NN (decimal) | | | | |
| 3 to 4 | length = n | | | | |
| 5 to 6 | enterprise ID = XXX | | | | |
| 7 | spare | Ver = 2 | V6 = 0 | V4 = 1 | |
| 8 to 9 | spare | | | | |
| 10 to 11 | local tunnel ID (16 bits) | | | | |
| 12 to 13 | spare | | | | |
| 14 to 15 | remote tunnel ID (16 bits) | | | | |
| 16 to 19 | local IPv4 address | | | | |
| 20 to 23 | remote IPv4 address | | | | |

For example, if the version is L2TPV3, and an IPv6 address is used, a structure of the PFCP update request packet is shown in Table 7.

TABLE 7

| Octets | Bits | | | | |
|---|---|---|---|---|---|
| | 8 7 | 6 5 4 3 | 2 | 1 | |
| 1 to 2 | message type = NN (decimal) | | | | |
| 3 to 4 | length = n | | | | |
| 5 to 6 | enterprise ID = XXX | | | | |
| 7 | spare | Ver = 3 | V6 = 1 | V4 = 0 | |
| 8 to 11 | local tunnel ID | | | | |
| 12 to 15 | remote tunnel ID | | | | |
| 16 to 31 | local IPv6 address | | | | |
| 32 to 47 | remote IPv6 address | | | | |

The foregoing describes a process in which the CP device synchronizes tunnel information to the UP device when communication between the UP device and the CP device is normal. In this embodiment of this application, the CP device can further send first session information to the UP device, and the UP device receives the first session information sent by the CP device. The first session information includes information about a session carried on the one or more tunnels. In other words, the CP device synchronizes the session information to the UP device.

Optionally, the first session information is also carried in a PFCP update request packet, and information about a session carried on each of the one or more tunnels includes a local tunnel identifier, a local session identifier, and a remote session identifier.

In a PFCP node message, a PFCP update request packet that carries the first session information includes one Grouped IE, the Grouped IE includes one or more Embedded IEs, and each Embedded IE carries information about one session. The PFCP update request packet that carries the first session information is obtained by extending the Grouped IE.

Table 8 describes the session information carried in the PFCP update request packet. The PFCP update request packet carries a device number of the CP device, that is, a node identifier of the CP device. When an L2TP session is created, the PFCP update request packet further carries information about each created session. When an L2TP session is deleted, the PFCP update request packet further carries information about each deleted session.

TABLE 8

| Embedded IE | P | Condition/Content | IE type |
|---|---|---|---|
| Node ID | M | Device number of the CP | Node identifier |
| Create an L2TP session. | C | Create an L2TP session; a plurality of IEs can be carried | create L2TP session |
| Delete an L2TP Session | C | Delete an L2TP session; a plurality of IEs can be carried | delete L2TP session |

For example, Table 9 describes a structure of a PFCP update request packet obtained by extending a Grouped IE. When an L2TP session is created or deleted, the first two octets carry a session message type, the third and fourth octets carry length, which is used to indicate a packet length, the fifth and sixth octets carry an enterprise ID, which indicates which enterprise extends the packet. Starting from the seventh octet, information about the created or deleted session is carried.

TABLE 9

| Octets 1 and 2 | Session message type | | |
|---|---|---|---|
| Octets 3 and 4 | Length (Length) = n | | |
| Octets 5 and 6 | Enterprise ID (Enterprise ID) = XXX | | |
| IEs | P | Condition/Content | IE type |
| L2TP session | M | L2TP session information | L2TP session |

Table 10 is a schematic diagram of a structure of a PFCP update request packet that carries information about one session and that is obtained by extending an embedded IE.

TABLE 10

| | Bits | | | | | | | |
|---|---|---|---|---|---|---|---|---|
| Octets | 8 | 7 | 6 | 5 | 4 | 3 | 2 | 1 |
| 1 to 2 | message type = NN (decimal) | | | | | | | |
| 3 to 4 | length = n | | | | | | | |
| 5 to 6 | enterprise ID = XXX | | | | | | | |
| 7 | spare | | | | Ver | | | |
| 8 to 11 | local tunnel ID | | | | | | | |
| 12 to 15 | local session ID | | | | | | | |
| 16 to 19 | remote session ID | | | | | | | |

In Table 10, in bits 1 to 4 of octet 7, Ver indicates a version number of an L2TP tunnel. The value of Ver being 2 indicates an L2TPV2 version. In this case, the session ID is a 16-bit unsigned integer. The value of Ver being 3 indicates an L2TPV3 version. In this case, the session ID is a 32-bit unsigned integer.

Bits 5 to 8 of the octet 7 are reserved fields and are set to 0.

Octets 8 to 11: local tunnel identifier (local tunnel ID), 32-bit unsigned integer, L2TPV2 version (lower 16 bits are valid). It indicates the tunnel to which the session belongs.

Octets 12 to 15: local session identifier (local session ID), 32-bit unsigned integer, L2TPV2 (lower 16 bits are valid).

Octets 16 to 19: remote session identifier (remote session ID), 32-bit unsigned integer, L2TPV2 (lower 16 bits are valid).

It should be noted that, in the first implementation, the first tunnel information and the first session information are carried in different PFCP update request packets respectively, and one PFCP update request packet carries information about one created tunnel, or information about one deleted tunnel, or information about one created session, or information about one deleted session. After receiving the PFCP update request packet that carries the information about the created tunnel or session, the UP device locally stores the information about the created tunnel or session. After receiving the PFCP update request packet that carries the information about the deleted tunnel or session, the UP device deletes locally stored information about the corresponding tunnel or session.

Second implementation: The CP device periodically synchronizes the first tunnel information to the UP device.

That is, the CP device synchronizes information about all established tunnels stored in the CP device to the UP device at intervals of one synchronization periodicity. Alternatively, the CP device synchronizes updated tunnel information to the CP device at intervals of one synchronization periodicity, where the updated tunnel information includes information about a tunnel that is established or deleted after last tunnel information synchronization.

Optionally, the first tunnel information is carried in a PFCP update request packet. If the CP device stores information about a plurality of established tunnels, the first tunnel information includes the information about the plurality of established tunnels, and information about each tunnel includes tunnel description information.

In the second implementation, the CP device can further periodically synchronize the first session information to the UP device. The first session information is carried in a PFCP update request packet. For related descriptions of the PFCP update request packet, refer to the foregoing related descriptions. Details are not described herein again.

It should be noted that in this embodiment of this application, the first tunnel information and the first session information may be carried in a same PFCP update request packet, or may be carried in different PFCP update request packets.

For example, it is assumed that the CP device synchronizes, to the UP device at intervals of one synchronization periodicity by using one PFCP update request packet, information that is about all created tunnels and sessions and that is stored in the CP device. Alternatively, the CP device synchronizes information about all created tunnels stored in the CP device to the UP device at intervals of one synchronization periodicity by using one PFCP update request packet, and synchronizes information about all sessions stored in the CP device to the UP device by using another PFCP update request packet.

Optionally, in this embodiment of this application, after receiving the PFCP update request packet, the UP device can send a PFCP update reply packet to the CP device.

For example, as shown in Table 1, the PFCP update reply packet carries a message type. The message type may be any value from 16 to 49 that is different from the message type carried in the PFCP update request packet. The message type is used to indicate that a corresponding packet is a PFCP update reply packet, which is also referred to as a PFCP L2TP tunnel update reply. As shown in Table 11, the PFCP update reply packet further carries a device number of the UP device, that is, a node identifier of the UP device. The PFCP update reply packet further carries a processing result (also referred to as a cause), and the processing result is used to indicate whether the UP device successfully parses the PFCP update request packet.

TABLE 11

| Embedded IE | P | Condition/Content | IE type |
|---|---|---|---|
| Node ID | M | Device number of the UP | Node identifier |
| cause | M | Processing result (success/error code) | cause |

Step 302: If communication between the UP device and the CP device fails, the UP device performs tunnel keepalive on the one or more tunnels based on the first tunnel information, and the CP device stops performing tunnel keepalive on the one or more tunnels.

In this embodiment of this application, the UP device communicates with the CP device by using a plurality of communications interfaces, for example, a communications interface between a CP device and a UP device in a vBNG defined in Broadband Forum (broadband-forum, BBF) WT-459 (also referred to as TR-459), including a control packet redirection interface (CPRi) and a state control interface (SCi). The UP device communicates with the CP device by using the control packet redirection interface and the state control interface, and the UP device monitors statuses of the control packet redirection interface and the state control interface. If the UP device detects that the status of the control packet redirection interface and/or the status of the state control interface are/is abnormal, the UP device determines that a failure is detected in communication between the UP device and the CP device.

Similarly, the CP device communicates with the UP device by using the control packet redirection interface and the state control interface. The CP device monitors statuses of the control packet redirection interface and the state control interface. If the CP device detects that the status of the control packet redirection interface and/or the status of the state control interface are/is abnormal, the CP device determines that a failure occurs in communication between the CP device and the UP device.

In this embodiment of this application, if the UP device detects that communication between the UP device and the CP device fails, the UP device performs tunnel keepalive on the one or more tunnels based on the first tunnel information; or if the CP device detects that communication between the CP device and the UP device fails, the CP device stops performing tunnel keepalive on the one or more tunnels.

It should be noted that, in this embodiment of this application, tunnel keepalive is independently performed on each tunnel, that is, each tunnel is corresponding to tunnel keepalive sequence numbers. The UP device or the CP device exchanges tunnel keepalive packets with the remote network device, to keep the tunnel alive. The tunnel keepalive sequence numbers include a sending sequence number and an expected receiving sequence number. For example, for a tunnel, it is assumed that the UP device sends a tunnel keepalive packet to the remote network device. The tunnel keepalive packet is a packet that carries a sending sequence number 0 and an expected receiving sequence number 0. After receiving the tunnel keepalive packet, the remote network device sends, to the UP device, a tunnel keepalive packet that carries a sending sequence number 0 and an expected receiving sequence number 1. The UP device continues to send, to the remote network device, a tunnel keepalive packet that carries a sending sequence number 1 and an expected receiving sequence number 1. The remote network device sends, to the UP device, a tunnel keepalive packet that carries a sending sequence number 1 and an expected receiving sequence number 2. By analogy, the UP device and the remote network device periodically send tunnel keepalive packets that carry tunnel keepalive sequence numbers, to keep the tunnel alive. If the remote network device does not receive an expected tunnel keepalive packet within a specific period, the remote network device tears down the tunnel. When communication between the UP device and the CP device is normal, if the CP device does not receive a tunnel keepalive packet within a specified period, the CP device tears down the tunnel.

Optionally, the tunnel keepalive packet is a Hello (Hel) packet or a zero-length body message (ZLB) packet specified in the L2TP.

However, when communication between the UP device and the CP device fails, the tunnel is not expected to be torn down, that is, a user service of the terminal is not expected to be interrupted. Therefore, the UP device needs to continue to keep the tunnel alive. The following describes an implementation in which the UP device performs tunnel keepalive when the UP device detects that communication between the UP device and the CP device fails.

First implementation: The UP device monitors a first tunnel keepalive packet sent by the remote network device, where the first tunnel keepalive packet carries an identifier and tunnel keepalive sequence numbers of a target tunnel, and the UP device sends a second tunnel keepalive packet to the remote network device based on the identifier and the tunnel keepalive sequence numbers of the target tunnel, and the identifiers of the one or more tunnels.

In this embodiment of this application, the UP device stores the first tunnel information synchronized by the CP device, the first tunnel information includes tunnel description information of the one or more tunnels established between the UP device and the remote network device, and the tunnel description information includes the identifiers of the tunnels. After detecting the first tunnel keepalive packet sent by the remote network device, the UP device searches the locally stored first tunnel information for the identifier of the target tunnel based on the identifier and the tunnel keepalive sequence numbers of the target tunnel that are carried in the first tunnel keepalive packet; and after finding the identifier of the target tunnel, the UP device locally stores the tunnel keepalive sequence numbers of the target tunnel, and sends a second tunnel keepalive packet to the remote network device based on the tunnel keepalive sequence numbers.

It should be noted that, starting from sending the second tunnel keepalive packet to the remote network device, the UP device starts to periodically exchange a tunnel keepalive packet with the remote network device, to enable the UP device to perform tunnel keepalive.

In this implementation, the remote network device does not sense that a failure occurs in communication between the CP device and the UP device. The UP device replaces the CP device and performs tunnel keepalive based on information about the tunnel currently maintained by the remote network device, that is, tunnel keepalive is performed quickly and seamlessly.

It can be learned from the foregoing description that, when communication between the UP device and the CP device is normal, the CP device further sends the first session information to the UP device. In this way, while keeping the tunnel alive, the UP device can further maintain, based on the first session information, a data packet between the terminal and the remote network device on the session carried on the tunnel, to ensure normal service communication of the terminal.

For example, the terminal sends the data packet to the UP device, the UP device sends the data packet to the remote network device by using the session carried on the tunnel created for the terminal, and then the remote network device sends the data packet to the remote access point, to implement service communication between the terminal and the remote access point.

The first implementation in which the UP device performs tunnel keepalive is described above by using only the target tunnel in the one or more tunnels as an example. For a tunnel other than the target tunnel in the one or more tunnels, according to a tunnel keepalive method the same as that for the target tunnel, the UP device can monitor a tunnel keepalive packet sent by the remote network device, to learn tunnel keepalive sequence numbers of the corresponding tunnel, and perform tunnel keepalive on the corresponding tunnel based on the detected tunnel keepalive sequence numbers. Details are not described in this embodiment of this application.

Second implementation: The UP device resets tunnel keepalive sequence numbers of a target tunnel in the first tunnel information, where the target tunnel is one of the one or more tunnels. The UP device indicates, based on the reset tunnel keepalive sequence numbers of the target tunnel, the remote network device to reset the tunnel keepalive sequence numbers of the target tunnel. After the remote network device successfully resets the tunnel keepalive sequence numbers of the target tunnel, the UP device performs tunnel keepalive on the target tunnel based on the reset tunnel keepalive sequence numbers of the target tunnel and an identifier of the target tunnel.

In this embodiment of this application, the UP device sends a first control request packet to the remote network device, where the first control request packet carries the identifier of the target tunnel, the reset tunnel keepalive sequence numbers of the target tunnel, and sequence number reset indication information. The UP device receives a first control reply packet sent by the remote network device, where the first control reply packet is used to indicate that the tunnel keepalive sequence numbers of the target tunnel are successfully reset by the remote network device.

Optionally, in this implementation, the UP device needs to perform tunnel failure recovery with the remote network device once. Tunnel failure recovery includes tunnel data reconciliation and tunnel keepalive sequence number resetting. That is, tunnel-related data reconciliation and tunnel keepalive sequence number resetting are performed once with the remote network device, to ensure tunnel consistency between the UP device and the remote network device, and tunnel keepalive is performed based on the reset tunnel keepalive sequence numbers.

A process in which the UP device performs data reconciliation with the remote network device is as follows: The UP device creates a data reconciliation tunnel between the UP device and the remote network device, and sends a first tunnel data reconciliation packet to the remote network device through the data reconciliation tunnel. The first tunnel data reconciliation packet carries an identifier of a tunnel established between the UP device and the remote network device that is stored in the UP device. The UP device receives a first tunnel reconciliation reply packet sent by the remote network device. The first tunnel reconciliation reply packet carries an identifier of a tunnel established between the remote network device and the UP device that is stored in the remote network device. The UP device determines an intersection set of the tunnel identifier carried in the first tunnel data reconciliation packet and the tunnel identifier carried in the first tunnel reconciliation reply packet as the identifiers of the one or more tunnels.

In this embodiment of this application, the UP device first performs data reconciliation, and then resets the tunnel keepalive sequence numbers. Optionally, the UP device may first reset the tunnel keepalive sequence numbers of each tunnel included in the locally stored first tunnel information, and then send, to the remote network device through the created data reconciliation tunnel, a control request packet used for performing tunnel data reconciliation and tunnel keepalive sequence number resetting, so as to perform tunnel-related data reconciliation with the remote network device and reset the tunnel keepalive sequence numbers by using the control request packet. That is, the first control request packet and the first tunnel data reconciliation packet may be a same packet, and the first control reply packet and the first tunnel reconciliation reply packet may be a same packet.

Optionally, the UP device resets the tunnel keepalive sequence numbers of each tunnel included in the locally stored first tunnel information, establishes a data reconciliation tunnel (which may also be referred to as a recovery tunnel) with the remote network device, and sends a first control request packet to the remote network device through the data reconciliation tunnel. After the remote network device receives the first control request packet, if the remote network device stores information about the target tunnel, it indicates that data of the target tunnel in the remote network device and data of the target tunnel in the UP device are consistent, and a first control reply packet returned by the remote network device to the UP device carries the identifier of the target tunnel and indication information for confirming resetting of the tunnel keepalive sequence numbers of the target tunnel. After receiving the first control reply packet, the UP device determines that failure recovery for the target tunnel succeeds. If the remote network device does not store the information about the target tunnel, it indicates that data of the target tunnel in the remote network device and data of the target tunnel in the UP device are inconsistent. The first control reply packet returned by the remote network device to the UP device does not carry information about the target tunnel, or carries prompt information used to indicate that the target tunnel fails to be established. After receiving the first control reply packet, the UP device deletes locally stored information about the target tunnel.

Optionally, the first control request packet sent by the UP to the remote network device carries the identifiers of the one or more tunnels, reset tunnel keepalive sequence numbers of the one or more tunnels, and sequence number reset indication information. In other words, the UP device performs tunnel-related data reconciliation and tunnel keepalive sequence number resetting with the remote network device at a time by using one control request packet. After receiving the first control request packet, the remote network device sends, to the UP device by using the first control reply packet, identifiers of all tunnels stored in the remote network device and indication information for determining to reset tunnel keepalive sequence numbers of corresponding tunnels. After receiving the first control reply packet, the UP device determines, by comparing identifiers of one or more tunnels stored in the UP device with the tunnel identifiers carried in the first control reply packet, a tunnel stored in both the UP device and the remote network device, and clears a tunnel that is stored in only the UP but is not stored in the remote network device, to complete tunnel-related data reconciliation with the remote network device and tunnel keepalive sequence number resetting.

Optionally, after performing data reconciliation with the remote network device and resetting the tunnel keepalive sequence numbers, the UP device tears down the data reconciliation tunnel used for data reconciliation and requesting to reset the tunnel keepalive sequence numbers.

After tunnel-related data reconciliation is performed between the UP device and the remote network device, if the UP device stores the information about the target tunnel, the UP device performs tunnel keepalive on the target tunnel based on the reset tunnel keepalive sequence numbers of the target tunnel.

Optionally, the UP device resets the tunnel keepalive sequence numbers according to a communications protocol between the UP device and the remote network device. It is assumed that the communications protocol between the UP device and the remote network device is the L2TP protocol, and the L2TP protocol specifies that tunnel keepalive sequence numbers are 0 or 1 when a tunnel is created. As the CP device and the remote network device previously send a tunnel keepalive packet to each other to keep the tunnel alive, a tunnel packet sequence number carried in the tunnel keepalive packet dynamically increases. When the UP device performs tunnel keepalive through tunnel failure recovery, the UP device needs to reset the tunnel keepalive sequence numbers to 0 or 1, that is, to a start value.

After the UP device sends the first control request packet to the remote network device, the remote network device determines, based on the sequence number reset indication information, that tunnel failure recovery needs to be currently performed on the target tunnel, and the remote network device sends the first control reply packet to the UP device based on the reset tunnel keepalive sequence numbers of the target tunnel. After receiving the first control reply packet, the UP device determines that the failure recovery on the target tunnel succeeds.

After successfully recovering the failure of the target tunnel, the UP device performs tunnel keepalive on the target tunnel based on the reset tunnel keepalive sequence numbers of the target tunnel. In other words, the UP device periodically sends a tunnel keepalive packet to the remote network device starting from the reset tunnel keepalive sequence numbers of the target tunnel, so as to periodically exchange tunnel keepalive packets with the remote network device, to keep the target tunnel alive.

Optionally, both the first control request packet and the first tunnel data reconciliation packet are start control connection request (SCCRQ) packets in the L2TP protocol, and both the first control reply packet and the first tunnel reconciliation reply packet are start control connection reply (SCCRP) packets in the L2TP protocol.

The second implementation in which the UP device performs tunnel keepalive is described above by using the target tunnel in the one or more tunnels as an example. For a tunnel other than the target tunnel in the one or more tunnels, the UP device can perform tunnel keepalive on the corresponding tunnel through tunnel failure recovery according to a tunnel keepalive method the same as that for the target tunnel. Details are not described in this embodiment of this application.

It can be learned from the foregoing description that when communication between the UP device and the CP device is normal, the CP device further sends the first session information to the UP device. In this way, in addition to performing failure recovery on the target tunnel, the UP device can further update information about the session carried on the target tunnel in the first session information, to perform failure recovery on the session carried on the target tunnel.

In this embodiment of this application, after establishing the data reconciliation tunnel between the UP device and the remote network device, the UP device sends a first session data reconciliation packet to the remote network device, where the first session data reconciliation packet carries identifiers of one or more first reference sessions, and the one or more first reference sessions are sessions carried on the target tunnel that are stored in the UP device. The UP device receives a first session reconciliation reply packet sent by the remote network device. The first session reconciliation reply packet carries identifiers of one or more second reference sessions, and the one or more second reference sessions are sessions carried on the target tunnel that are stored in the remote network device. The UP device determines an intersection set of the identifiers of the one or more first reference sessions and the identifiers of the one or more second reference sessions as an identifier of a session carried on the target tunnel. In this way, sessions carried on the target tunnel can be aligned.

Optionally, the first session data reconciliation packet and the first tunnel data reconciliation packet are a same packet. In other words, the UP device sends, to the remote network device at a time by using the data reconciliation tunnel, the identifiers of the tunnels established between the UP device and the remote network device that are stored in the UP device and an identifier of a session carried on each tunnel, to perform tunnel data reconciliation and session data reconciliation.

Optionally, after successfully recovering the failure of the target tunnel, the UP device exchanges session information with the remote network device, to perform failure recovery on all sessions carried on the target tunnel, that is, perform failure recovery on the one or more first reference sessions carried on the target tunnel. In this case, the first session data reconciliation packet and the first tunnel data reconciliation packet are different packets.

For example, it is assumed that the sessions carried on the target tunnel that are stored in the UP device include a session 1, a session 2, and a session 3, and the sessions carried on the target tunnel that are stored in the remote network device include the session 1 and the session 2. The session 1 and the session 2 are successfully connected sessions, and the session 3 is a session that has not been connected between the CP device and the remote network device before a failure occurs in communication between the UP device and the CP device, that is, the session 3 is a half-connected session. The CP device stores information about the session 3, and synchronizes the information about the session 3 to the UP device, but the remote network device does not store the information about the session 3. In this case, a first failure recovery session query packet sent by the UP device to the remote network device carries identifiers of the session 1, the session 2, and the session 3, and a first failure recovery session reply packet returned by the remote network device to the UP device carries only the identifiers of the session 1 and the session 2. In this case, after receiving the first failure recovery session reply packet, the UP device deletes the locally stored information about the session 3, that is, clears the session in the half-connected state.

Similarly, it is assumed that a first failure recovery session query packet sent by the UP device to the remote network device carries a session 1 and a session 2, and a first failure recovery session reply packet returned by the remote network device to the UP device carries the session 1, the session 2, and a session 3. The session 3 is a session in a half-connected state created by the remote network device. After receiving the first failure recovery session query packet, the remote network device deletes information about the session 3 stored in the remote network device, that is, the remote network device also clears the session in the half-connected state.

Optionally, the first session data reconciliation packet is a failover session query (FSQ) packet in the L2TP protocol, and the first session reconciliation reply packet is a failover session response (FSR) packet in the L2TP protocol.

It can be learned from the foregoing description that, the UP device and the remote network device delete the session that has not been created between the UP device and the remote network device through session failure recovery, that is, the session in the half-connected state is cleared.

It should be noted that, for a session carried on a tunnel other than the target tunnel in the one or more tunnels, the UP device can perform session failure recovery on the session carried on the corresponding tunnel by using the same method as that for recovering the session carried on the target tunnel. Details are not described in this embodiment of this application.

Optionally, a failure recovery function proposed in the L2TP RFC 4951 specification may be used in tunnel failure recovery and session failure recovery performed by the UP device in the second implementation of tunnel keepalive.

When establishing a tunnel with the remote network device through the UP device, the CP device, the UP device, and the remote network device negotiate whether to enable the failure recovery function. If the failure recovery function is enabled on the CP device, the UP device, and the remote network device, the failure recovery function is started when the UP device starts to perform tunnel keepalive, to perform tunnel failure recovery and session failure recovery with the remote network device.

It should be noted that, in the foregoing second implementation, the UP device performs tunnel failure recovery and session failure recovery with the remote network device, that is, performs tunnel and session data reconciliation and resets the tunnel keepalive sequence numbers, so that the UP device can more accurately perform tunnel keepalive on the tunnel established between the UP device and the remote network device.

The method in which the UP device performs tunnel keepalive is described above by using the target tunnel in the one or more tunnels as an example. For a tunnel other than the target tunnel in the one or more tunnels, the UP device can perform tunnel keepalive according to a tunnel keepalive method the same as that for the target tunnel. Details are not described in this embodiment of this application.

Step 303: If communication between the CP device and the UP device recovers, the CP device performs tunnel keepalive on the one or more tunnels again, and the UP device stops performing tunnel keepalive on the one or more tunnels.

In this embodiment of this application, after the CP device detects that communication between the CP device and the UP device is recovered, the CP device needs to perform tunnel keepalive on the one or more tunnels again, and the UP device stops tunnel keepalive after detecting that communication between the UP device and the CP device is recovered.

It can be learned from the foregoing description that the CP device communicates with the UP device by using the control packet redirection interface and the state control interface. The CP device monitors statuses of the control packet redirection interface and the state control interface. If the CP device detects that the status of the control packet redirection interface and/or the status of the state control interface are/is normal, the CP device determines that communication between the CP device and the UP device is recovered.

Similarly, the UP device communicates with the CP device by using the control packet redirection interface and the state control interface. The UP device monitors statuses of the control packet redirection interface and the state control interface. If the UP device detects that the status of the control packet redirection interface and/or the status of the state control interface are/is normal, the UP device determines that communication between the UP device and the CP device is recovered.

In this embodiment of this application, an implementation in which the CP device performs tunnel keepalive again is as follows: The CP device resets locally stored tunnel keepalive sequence numbers of the target tunnel, where the target tunnel is one of the one or more tunnels. The CP device indicates, based on the reset tunnel keepalive sequence numbers of the target tunnel, the remote network device to reset the tunnel keepalive sequence numbers of the target tunnel. After the remote network device successfully resets the tunnel keepalive sequence numbers of the target tunnel, the CP device performs tunnel keepalive on the target tunnel through the UP device based on the reset tunnel keepalive sequence numbers of the target tunnel and the identifier of the target tunnel.

An implementation in which the CP device resets the locally stored tunnel keepalive sequence numbers of the target tunnel is similar to the foregoing implementation in which the UP device resets the tunnel keepalive sequence numbers of the target tunnel. For example, the CP device resets the tunnel keepalive sequence numbers of the target tunnel to 0 or 1, that is, resets the tunnel keepalive sequence numbers of the target tunnel to an initial value specified in a communications protocol.

In this embodiment of this application, after resetting the tunnel keepalive sequence numbers of the target tunnel, the CP device sends a second control request packet to the remote network device by using the UP device. The second control request packet carries the identifier of the target tunnel, the reset tunnel keepalive sequence numbers of the target tunnel, and sequence number reset indication information. Then, the CP device receives, by using the UP device, a second control reply packet sent by the remote network device. The second control reply packet is used to indicate that the remote network device successfully resets the tunnel keepalive sequence numbers of the target tunnel.

After the CP device sends the second control request packet to the remote network device through the UP device, the remote network device determines, based on the sequence number reset indication information, that tunnel failure recovery needs to be currently performed on the target tunnel, and the remote network device sends the first control reply packet to the CP device based on the reset tunnel keepalive sequence numbers of the target tunnel. After receiving the second control reply packet through the UP device, the CP device determines that the failure recovery on the target tunnel succeeds.

Optionally, in this embodiment of this application, a process in which the CP device performs tunnel failure recovery also includes tunnel data reconciliation and tunnel keepalive sequence number resetting.

Optionally, before resetting the locally stored tunnel keepalive sequence numbers of the target tunnel, the CP device creates a data reconciliation tunnel to the remote network device, and sends a second data reconciliation packet to the remote network device through the data reconciliation tunnel by using the UP device. The second data reconciliation packet carries an identifier of a tunnel established between the UP device and the remote network device that is stored in the CP device. The CP device receives, by using the UP device, a second reconciliation reply packet sent by the remote network device. The second reconciliation reply packet carries an identifier of a tunnel established between the remote network device and the UP device that is stored in the remote network device. The CP device determines an intersection set of the tunnel identifier carried in the second data reconciliation packet and the tunnel identifier carried in the second reconciliation reply packet as identifiers of the one or more tunnels.

In a process in which the UP device exchanges tunnel keepalive packets with the remote network device to perform tunnel keepalive, the remote network device may send a tunnel teardown request to the UP device, to actively tear down a tunnel. After receiving the teardown request, the UP device may tear down the corresponding tunnel, or may not tear down the corresponding tunnel. That is, in the process in which the UP device performs tunnel keepalive, the tunnel established between the UP device and the remote network device is updated. Based on this, after communication between the CP device and the UP device is recovered, the CP device and the remote network device perform tunnel-related data reconciliation on the tunnel between the UP device and the remote network device through tunnel failure recovery, to clear a torn tunnel stored in the CP device, so as to ensure tunnel consistency between the CP device and the remote network device.

In this embodiment of this application, the CP device first performs data reconciliation, and then resets the tunnel keepalive sequence numbers. Optionally, the CP device may first reset the locally stored tunnel keepalive sequence numbers of each tunnel, and then send, to the remote network device through the created data reconciliation tunnel, a control request packet used for performing tunnel data reconciliation and tunnel keepalive sequence number resetting, so as to perform tunnel-related data reconciliation with the remote network device and reset the tunnel keepalive sequence numbers by using the control request packet. That is, the second control request packet and the second tunnel data reconciliation packet may be a same packet, and the second control reply packet and the second tunnel reconciliation reply packet may be a same packet.

Optionally, the CP device resets the locally stored tunnel keepalive sequence numbers of each tunnel, establishes a data reconciliation tunnel (which may also be referred to as a recovery tunnel) with the remote network device by using the UP device, and sends the second control request packet to the remote network device through the data reconciliation tunnel by using the UP device. After the remote network device receives the second control request packet, if the remote network device stores information about the target tunnel, it indicates that data of the target tunnel in the remote network device and data of the target tunnel in the CP device are consistent, and the second control reply packet returned by the remote network device to the CP device carries the identifier of the target tunnel and indication information for confirming resetting of the tunnel keepalive sequence numbers of the target tunnel. After receiving the second control reply packet through the UP device, the CP device determines that failure recovery for the target tunnel succeeds. If the remote network device does not store the information about the target tunnel, it indicates that data of the target tunnel in the remote network device and data of the target tunnel in the CP device are inconsistent. The second control reply packet returned by the remote network device to the CP device does not carry information about the target tunnel, or carries prompt information used to indicate that the target tunnel fails to be established. After receiving the second control reply packet through the UP device, the CP device deletes locally stored information about the target tunnel.

Optionally, the second control request packet sent by the CP to the remote network device carries the identifiers of the one or more tunnels, reset tunnel keepalive sequence numbers of the one or more tunnels, and sequence number reset indication information. In other words, the CP device performs tunnel-related data reconciliation and tunnel keepalive sequence number resetting with the remote network device at a time by using one control request packet. After receiving the second control request packet, the remote network device sends, to the CP device by using the second control reply packet, identifiers of all tunnels stored in the remote network device and indication information for determining to reset tunnel keepalive sequence numbers of corresponding tunnels. After receiving the second control reply packet through the UP device, the CP device determines, by comparing identifiers of one or more tunnels stored in the CP device with the tunnel identifiers carried in the second control reply packet, a tunnel stored in both the CP device and the remote network device, and clears a tunnel that is stored in only the CP but is not stored in the remote network device, to complete tunnel-related data reconciliation with the remote network device and tunnel keepalive sequence number resetting.

For example, it is assumed that before communication between the CP device and the UP device fails, tunnel information synchronized by the CP device to the UP device for the last time includes information about a tunnel 1, a tunnel 2, and a tunnel 3. When communication between the UP device and the CP device fails, the tunnel 3 is torn down by the remote network device in a process in which the UP device performs tunnel keepalive. In this case, after communication between the CP device and the UP device recovers, the CP device performs tunnel failure recovery with the remote network device, tunnel keepalive sequence numbers of the tunnel 1 and the tunnel 2 are reset through negotiation with the remote network device, and then tunnel keepalive is performed on the tunnel 1 and the tunnel 2. For the tunnel 3, after the CP device sends a control request packet for resetting tunnel keepalive sequence numbers of the tunnel 3 to the remote network device, because information about the tunnel 3 has been deleted from the remote network device, the remote network device returns, to the CP device, a control reply packet indicating that the tunnel 3 is not found. After receiving the control reply packet, the CP device deletes the information about the tunnel 3.

Optionally, both the second control request packet and the second tunnel data reconciliation packet are SCCRQ packets in the L2TP protocol, and both the second control reply packet and the second tunnel reconciliation reply packet are SCCRP packets in the L2TP protocol.

Optionally, after performing data reconciliation with the remote network device and resetting the tunnel keepalive sequence numbers, the CP device tears down the data reconciliation tunnel used for data reconciliation and requesting to reset the tunnel keepalive sequence numbers.

After tunnel-related data reconciliation is performed between the CP device and the remote network device, if the CP device stores the information about the target tunnel, the CP device performs tunnel keepalive on the target tunnel based on the reset tunnel keepalive sequence numbers of the target tunnel by using the UP device.

An implementation in which the CP device performs tunnel keepalive again is described above by using the target tunnel in the one or more tunnels as an example. For a tunnel other than the target tunnel in the one or more tunnels, the CP device can perform tunnel keepalive on the corresponding tunnel through tunnel failure recovery according to a tunnel keepalive method the same as that for the target tunnel. Details are not described in this embodiment of this application.

In this embodiment of this application, in addition to performing failure recovery on the target tunnel by using the UP device, the CP device can further update, by using the UP device, stored information about a session carried on the target tunnel, to perform failure recovery on the session carried on the target tunnel.

In this embodiment of this application, after establishing the data reconciliation tunnel between the CP device and the remote network device, the CP device sends a second session data reconciliation packet to the remote network device through the UP device. The second session data reconciliation packet carries identifiers of one or more first reference sessions, and the one or more first reference sessions are sessions carried on the target tunnel that are stored in the CP device. The CP device receives, through the UP device, a second session reconciliation reply packet sent by the remote network device. The second session reconciliation reply packet carries identifiers of one or more third reference sessions, and the one or more third reference sessions are sessions carried on the target tunnel that are stored in the remote network device. The CP device determines an intersection set of the identifiers of the one or more first reference sessions and the identifiers of the one or more third reference sessions as an identifier of a session carried on the target tunnel. In this way, sessions carried on the target tunnel can be aligned.

Optionally, the second session data reconciliation packet and the second tunnel data reconciliation packet are a same packet. In other words, the CP device sends, to the remote network device at a time by using the data reconciliation tunnel, the identifiers of the tunnels established between the UP device and the remote network device that are stored in the CP device and an identifier of a session carried on each tunnel, to perform tunnel data reconciliation and session data reconciliation.

It can be learned from the foregoing description that, in a process in which the UP device performs tunnel keepalive, a tunnel established between the UP device and the remote network device is torn down. In addition, a session that is created between the UP device and the remote network device and that is carried on the tunnel is also torn down. Based on this, after communication between the CP device and the UP device is recovered, the torn-down session stored in the CP device is deleted through session failure recovery, that is, the CP device performs session-related data reconciliation once with the remote network device, to ensure session consistency between the CP device and the remote network device.

Optionally, the second session data reconciliation packet is an FSQ packet in the L2TP protocol, and the second session reconciliation reply packet is an FSR packet in the L2TP protocol.

It should be noted that, for a session carried on a tunnel other than the target tunnel in the one or more tunnels, the CP device can perform session failure recovery on the session carried on the corresponding tunnel by using the same method as that for recovering the session carried on the target tunnel. Details are not described in this embodiment of this application.

In this embodiment of this application, in an implementation in which the CP device performs tunnel keepalive again, an implementation in which the CP device performs tunnel failure recovery and session failure recovery is similar to that of the UP device, that is, the CP device performs tunnel failure recovery and session failure recovery during tunnel keepalive again, and may also use the failure recovery function proposed in the L2TP RFC 4951 specification. It can be learned from the foregoing description that when establishing a tunnel with the remote network device through the UP device, the CP device, the UP device, and the remote network device negotiate whether to enable the failure recovery function. If the failure recovery function is enabled on the CP device, the UP device, and the remote network device, the failure recovery function is started when the CP device starts to perform tunnel keepalive again, to perform tunnel failure recovery and session failure recovery with the remote network device.

It should be noted that for all tunnels other than the target tunnel in the one or more tunnels, the CP device can perform tunnel failure recovery and session failure recovery according to a failure recovery method the same as that for the target tunnel. Details are not described in this embodiment of this application.

In this embodiment of this application, after performing tunnel failure recovery by using the UP device, the CP device sends second tunnel information to the UP device, the UP device receives the second tunnel information sent by the CP device, and the UP device updates locally stored tunnel information based on the second tunnel information. The second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers. That is, the CP device synchronizes tunnel information to the UP device again.

Optionally, the second tunnel information is carried in a PFCP update request packet. For detailed descriptions of the second tunnel information, refer to the foregoing related descriptions of the first tunnel information. Details are not described herein again.

In this embodiment of this application, after performing failure recovery on the session on the target tunnel by using the UP device, the CP device sends second session information to the UP device, the UP device receives the second session information sent by the CP device, and the UP device updates locally stored session information based on the second session information. The second session information includes information that is stored in the CP device at the second moment and that is about a session carried on the one or more tunnels established between the UP device and the remote network device. That is, the CP device synchronizes session information to the UP device again.

Optionally, the second moment is a moment at which the CP device completes session failure recovery with the remote network device by using the UP device after communication between the CP device and the UP device is recovered.

Optionally, the second session information is carried in a PFCP update request packet. For detailed descriptions of the second session information, refer to the foregoing related descriptions of the first session information. Details are not described herein again.

If the first moment is a moment at which the CP device completes tunnel failure recovery with the remote network device by using the UP device, the CP device may send the second tunnel information to the UP device after performing tunnel failure recovery on the one or more tunnels, and send the second session information to the UP device after performing session failure recovery on the session carried on the one or more tunnels; or send third tunnel information and the second session information to the UP device, where the third tunnel information includes information that is stored in the CP device at the second moment and that is about one or more tunnels established between the UP device and the remote network device. Optionally, the third tunnel information and the second session information are carried in a same PFCP packet or different PFCP packets.

When both the first moment and the second moment are the moment at which the CP device completes session failure recovery with the remote network device by using the UP device, the CP device may send the second tunnel information and the second session information to the UP device after performing tunnel failure recovery and session failure recovery on the one or more tunnels. The second tunnel information and the second session information are carried in one PFCP update request packet or carried in different PFCP update request packets.

Optionally, for a session carried on each of the one or more tunnels, each time the CP device recovers a session carried on a tunnel, the CP device sends information about the session carried on the tunnel to the remote network device by using the UP device, so as to synchronize the second session information to the UP device through multiple times of information sending.

Optionally, in this embodiment of this application, after receiving the PFCP update request packet that carries the second tunnel information and/or the second session information, the UP device sends a PFCP update reply packet to the CP device. For a related description of the PFCP update reply packet, refer to the related description in Table 11.

In this embodiment of this application, after performing tunnel failure recovery and session failure recovery with the remote network device, the CP device continues to synchronize latest tunnel information and session information to the UP device in an instant manner or a periodic manner after synchronizing tunnel information and session information to the UP device once, to prepare for a subsequent failure occurring again in communication between the UP device and the CP device.

Figure 4A:
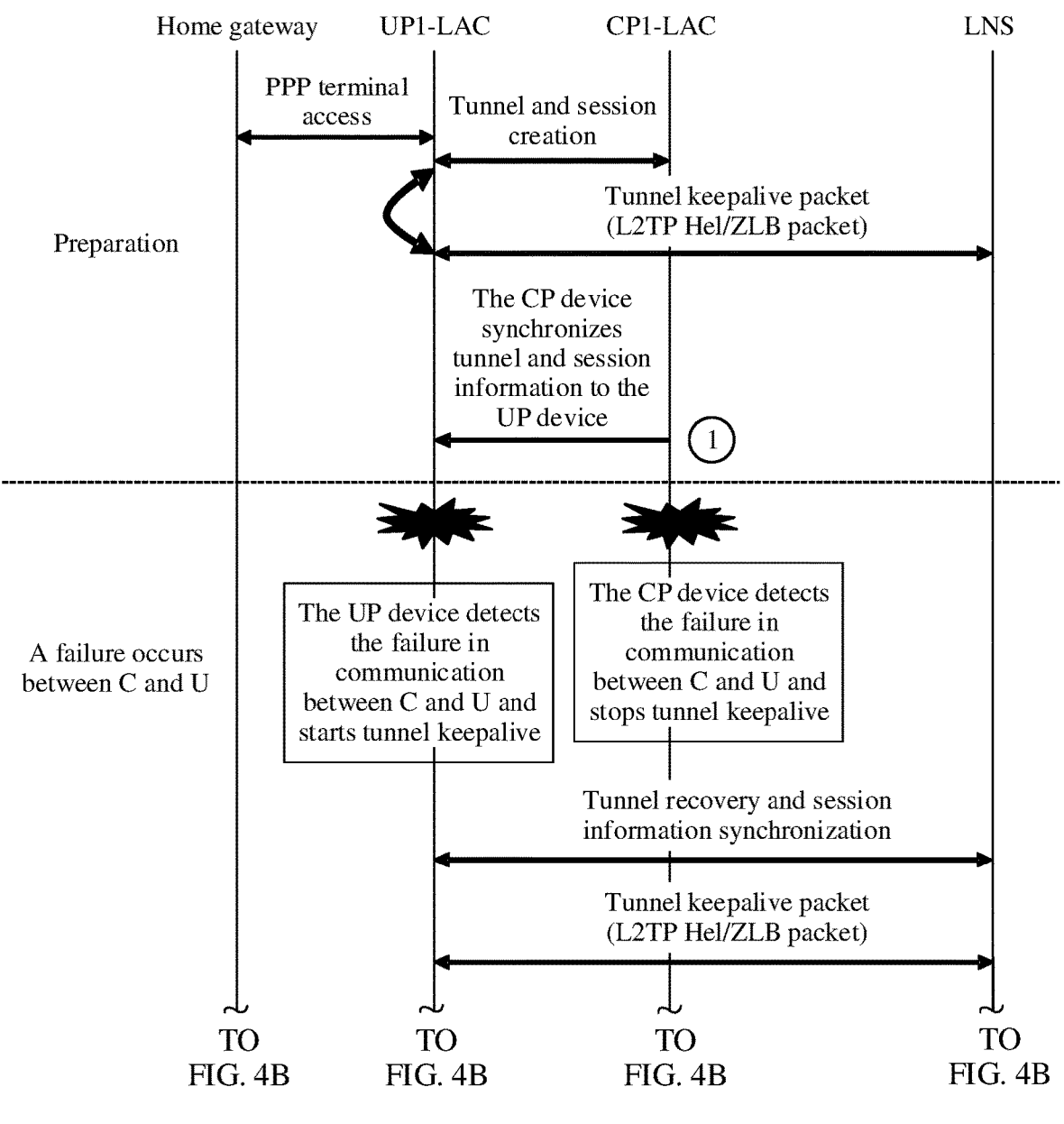

The following describes the tunnel keepalive packet provided in this embodiment of this application again with reference to FIG. 4A and FIG. 4B by using an example of an application scenario. As shown in FIG. 4A and FIG. 4B, the terminal is a home gateway. The home gateway accesses a network by using a point-to-point protocol (PPP) request. The CP device (CP-LAC) creates a tunnel and a session between the UP device (UP-LAC) and the remote network device (LNS), to connect the terminal to a remote network. The CP device exchanges a Hello packet/ZLB packet with the remote network device through the UP device to perform tunnel keepalive, and the CP device synchronizes L2TP tunnel information and session information to the UP device. When a failure occurs in communication between the UP device and the CP device, the CP device detects the failure and stops tunnel keepalive, and the UP device detects the failure and starts tunnel keepalive. The UP device and the remote network device synchronize tunnel and session information and exchange tunnel keepalive packets to each other to perform tunnel keepalive. After communication between the UP device and the CP device recovers, the UP device stops tunnel keepalive, and the CP device performs tunnel keepalive again. The CP device and the remote network device synchronize tunnel and session information with each other through the UP device, and send tunnel keepalive packets to each other to perform tunnel keepalive. In addition, the CP device synchronizes the current tunnel and session information to the UP device. The tunnel and session information may be synchronized between the CP device and the UP device by using a PFCP update request packet.

In this embodiment of this application, an L2TP proxy module is disposed on the UP device, to implement a tunnel keepalive function on the UP device. For example, as shown in FIG. 5, Table 12, and Table 13, the UP device includes a PFCP protocol module, a PFCP L2TP module, and an L2TP proxy module, and the CP device includes an LAC function module, an LNS function module, a PFCP L2TP module, and a PFCP protocol module. The CP device sends a PFCP update request packet to the UP device through an SCi interface. The UP device decodes a message header of the PFCP update request packet by using the PFCP protocol module. The PFCP protocol module of the UP device sends a message body of the PFCP update request packet obtained through decoding to the PFCP L2TP module. The PFCP L2TP module of the UP device parses the message body to obtain tunnel information and/or session information, and sends the tunnel information and/or the session information to the L2TP proxy module, the L2TP proxy module stores the tunnel information and/or the session information, and according to the tunnel keepalive method provided in this embodiment of this application, tunnel keepalive is performed when communication between the UP device and the CP device fails. In this embodiment of this application, for function descriptions of the modules on the UP device, refer to Table 12. For function descriptions of the modules on the CP device, refer to Table 13.

TABLE 12

| Modules of the UP device | Function |
| --- | --- |
| PFCP protocol module | Receive a PFCP packet, decode a message header, and distribute the packet to the corresponding PFCP L2TP module. |
| PFCP L2TP module | Process L2TP tunnel/session create/delete messages delivered by the CP device, decode a message body, and distribute data to the L2TP proxy module. |
| L2TP proxy module | Record L2TP tunnel and session information delivered by the CP plane; monitor statuses of a control packet redirection interface and a state control interface between C and U; interact with the remote network device to perform tunnel keepalive after detecting a failure in communication between C and U; and stop tunnel keepalive after detecting that the communication between C and U is recovered. |

TABLE 13

| Modules of the CP device | Function |
| --- | --- |
| LAC function module | Function as an L2TP LAC. |
| LNS function module | Function as an L2TP LNS. |
| PFCP L2TP module | Process L2TP tunnel/session create/delete message delivered by the LAC module and send tunnel and session information to the PFCP L2TP module. |
| PFCP protocol module | Receive the tunnel/session information from the PFCP L2TP module, encapsulate the information into a PFCP update request packet, and send the packet to the UP device. |

In conclusion, in this embodiment of this application, before a failure occurs in communication between the UP device and the CP device, the UP device receives the tunnel information synchronized by the CP device. After the communication between the UP device and the CP device fails, the UP device performs tunnel keepalive based on the tunnel information, that is, the UP device maintains the tunnel between the UP device and the remote network device. In this way, tunnel teardown is not triggered due to the communication failure between the CP device and the UP device. This solution can ensure that a connection between the terminal and the remote network is not interrupted, that is, a user service is not affected.

FIG. 6 is a schematic diagram of a structure of a network device 600 according to an embodiment of this application. The network device 600 may be implemented as a part or all of a UP device by using software, hardware, or a combination thereof. The UP device may be the UP device shown in the foregoing embodiments. In this embodiment of this application, a CP device and the UP device are used to interact with a remote network device to ensure that a terminal accesses a network. As shown in FIG. 6, the network device 600 includes a first receiving module 601 and a tunnel keepalive module 602.

The first receiving module 601 is configured to receive first tunnel information sent by the CP device, where the first tunnel information includes information about one or more tunnels established between the UP device and the remote network device. For a specific implementation, refer to detailed descriptions of step 301 in the embodiment in FIG. 3. Details are not described herein again.

The tunnel keepalive module 602 is configured to: if it is detected that communication between the UP device and the CP device fails, perform tunnel keepalive on the one or more tunnels based on the first tunnel information. For a specific implementation, refer to detailed descriptions of step 302 in the embodiment shown in FIG. 3, and details are not described herein again.

Optionally, the first tunnel information includes identifiers of the one or more tunnels.

The tunnel keepalive module 602 includes: a monitoring unit, configured to monitor a first tunnel keepalive packet sent by the remote network device, where the first tunnel keepalive packet carries an identifier and tunnel keepalive sequence numbers of a target tunnel; and a first sending unit, configured to send a second tunnel keepalive packet to the remote network device based on the identifier and the tunnel keepalive sequence numbers of the target tunnel, and the identifiers of the one or more tunnels. For a specific implementation, refer to detailed descriptions of step 302 in the embodiment shown in FIG. 3, and details are not described herein again.

Optionally, the first tunnel information includes identifiers of the one or more tunnels.

The tunnel keepalive module 602 includes: a resetting unit, configured to reset tunnel keepalive sequence numbers of a target tunnel, where the target tunnel is one of the one or more tunnels; an indication unit, configured to indicate, based on the reset tunnel keepalive sequence numbers of the target tunnel, the remote network device to reset the tunnel keepalive sequence numbers of the target tunnel; and a tunnel keepalive unit, configured to: after the remote network device successfully resets the tunnel keepalive sequence numbers of the target tunnel, perform tunnel keepalive on the target tunnel based on the reset tunnel keepalive sequence numbers of the target tunnel and an identifier of the target tunnel. For a specific implementation, refer to detailed descriptions of step 302 in the embodiment shown in FIG. 3, and details are not described herein again.

Optionally, the indication unit is specifically configured to: send a first control request packet to the remote network device, where the first control request packet carries the identifier of the target tunnel, the reset tunnel keepalive sequence numbers of the target tunnel, and sequence number reset indication information; and receive a first control reply packet sent by the remote network device, where the first control reply packet is used to indicate that the remote network device successfully resets the tunnel keepalive sequence numbers of the target tunnel. For a specific implementation, refer to detailed descriptions of step 302 in the embodiment shown in FIG. 3, and details are not described herein again.

Optionally, the tunnel keepalive module 602 further includes: a creation unit, configured to create a data reconciliation tunnel to the remote network device; a second sending unit, configured to send a first tunnel data reconciliation packet to the remote network device through the data reconciliation tunnel, where the first tunnel data reconciliation packet carries an identifier of a tunnel established between the UP device and the remote network device that is stored in the UP device; a first receiving unit, configured to receive a first tunnel reconciliation reply packet sent by the remote network device, where the first tunnel reconciliation reply packet carries an identifier of a tunnel established between the remote network device and the UP device that is stored in the remote network device; and a first determining unit, configured to determine an intersection set of the tunnel identifier carried in the first tunnel data reconciliation packet and the tunnel identifier carried in the first tunnel reconciliation reply packet as the identifiers of the one or more tunnels.

Optionally, the network device 60o further includes: a second receiving module, configured to receive first session information sent by the CP device, where the first session information includes information about a session carried on the one or more tunnels; for a specific implementation, refer to related description of step 301 in the embodiment shown in FIG. 3, and details are not described herein again.

The tunnel keepalive module 602 further includes: a third sending unit, configured to send a first session data reconciliation packet to the remote network device, where the first session data reconciliation packet carries identifiers of one or more first reference sessions, and the one or more first reference sessions are sessions carried on the target tunnel that are stored in the UP device; a second receiving unit, configured to receive a first session reconciliation reply packet sent by the remote network device, where the first session reconciliation reply packet carries identifiers of one or more second reference sessions, and the one or more second reference sessions are sessions carried on the target tunnel that are stored in the remote network device; and a second determining unit, configured to determine an intersection set of the identifiers of the one or more first reference sessions and the identifiers of the one or more second reference sessions as an identifier of a session carried on the target tunnel. For a specific implementation, refer to detailed descriptions of step 302 in the embodiment shown in FIG. 3, and details are not described herein again.

Optionally, the network device 600 further includes: a processing module, configured to: if it is detected that communication between the UP device and the CP device is recovered, stop performing tunnel keepalive on the one or more tunnels.

Optionally, the network device 600 further includes: a third receiving module, configured to receive second tunnel information sent by the CP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers; for a specific implementation, refer to detailed descriptions of step 303 in the embodiment in FIG. 3, and details are not described herein again; and an updating module, configured to update locally stored tunnel information based on the second tunnel information.

Optionally, the UP device communicates with the CP device by using a control packet redirection interface and a state control interface.

The tunnel keepalive module 602 includes: a monitoring unit, configured to monitor statuses of the control packet redirection interface and the state control interface; and a third determining unit, configured to: if it is detected that the status of the control packet redirection interface and/or the status of the state control interface are/is abnormal, determine that a failure is detected in communication between the UP device and the CP device. For a specific implementation, refer to detailed descriptions of step 302 in the embodiment shown in FIG. 3, and details are not described herein again.

Optionally, the first tunnel information is carried in a PFCP update request packet, the one or more tunnels are L2TP tunnels, and information about each of the one or more tunnels includes tunnel description information.

If the L2TP tunnel is created according to IPv4, the tunnel description information includes a local tunnel identifier, a remote tunnel identifier, a local tunnel IPv4 address, and a remote tunnel IPv4 address.

If the L2TP tunnel is created according to IPv6, the tunnel description information includes a local tunnel identifier, a remote tunnel identifier, a local tunnel IPv6 address, and a remote tunnel IPv6 address. For a specific implementation, refer to detailed descriptions of step 301 in the embodiment shown in FIG. 3, and details are not described herein again.

Optionally, the second tunnel information is carried in a PFCP update request packet.

Optionally, the first session information is carried in a PFCP update request packet, and information about a session carried on each of the one or more tunnels includes a local tunnel identifier, a local session identifier, and a remote session identifier. For a specific implementation, refer to detailed descriptions of step 301 in the embodiment shown in FIG. 3, and details are not described herein again.

In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device. This solution can ensure that a network connection between a terminal and a remote end is not interrupted, that is, a user service is not affected.

It should be noted that, when the network device provided in the foregoing embodiment performs tunnel keepalive, division of the foregoing functional modules is only used as an example for description. In an actual application, the functions may be allocated to different functional modules for implementation as required. To be specific, an internal structure of an apparatus is divided into different functional modules to implement all or a part of the functions described above. In addition, the network device provided in the foregoing embodiments pertains to a same concept as the embodiment of the tunnel keepalive method. For a specific implementation process of the network device, refer to the method embodiment. Details are not described herein.

Figure 7:
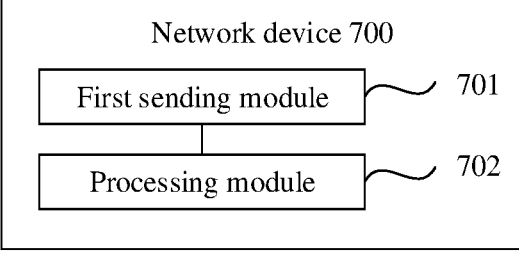
FIG. 7 is a schematic diagram of a structure of another network device according to an embodiment of this application.

FIG. 7 is a schematic diagram of a structure of a network device 700 according to an embodiment of this application. The network device 700 may be implemented as a part or all of a CP device by using software, hardware, or a combination thereof. The CP device may be the CP device shown in the foregoing embodiments. In this embodiment of this application, the CP device and a UP device are used to interact with a remote network device to ensure that a terminal accesses a network. As shown in FIG. 7, the network device 700 includes a first sending module 701 and a processing module 702.

The first sending module 701 is configured to send first tunnel information to the UP device, where the first tunnel information includes information about one or more tunnels established between the UP device and the remote network device. For a specific implementation, refer to detailed descriptions of step 301 in the embodiment in FIG. 3. Details are not described herein again.

The processing module 702 is configured to: if it is detected that communication between the CP device and the UP device fails, stop performing tunnel keepalive on the one or more tunnels. For a specific implementation, refer to detailed descriptions of step 302 in the embodiment in FIG. 3. Details are not described herein again.

The first tunnel information is used by the UP device to perform, based on the first tunnel information when the UP device detects that communication between the UP device and the CP device fails, tunnel keepalive on the one or more tunnels established between the UP device and the remote network device. For a specific implementation, refer to detailed descriptions of step 302 in the embodiment shown in FIG. 3, and details are not described herein again.

Optionally, as shown in FIG. 8, the network device 700 further includes: a tunnel keepalive module 703, configured to: if it is detected that communication between the CP device and the UP device is recovered, perform tunnel keepalive on the one or more tunnels again. For a specific implementation, refer to detailed descriptions of step 303 in the embodiment shown in FIG. 3, and details are not described herein again.

Optionally, the tunnel keepalive module 703 includes: a resetting unit, configured to reset locally stored tunnel keepalive sequence numbers of each tunnel in the one or more tunnels; an indication unit, configured to indicate, based on the reset tunnel keepalive sequence numbers of the target tunnel, the remote network device to reset the tunnel keepalive sequence numbers of the target tunnel; and a tunnel keepalive unit, configured to: after the remote network device successfully resets the tunnel keepalive sequence numbers of the target tunnel, perform tunnel keepalive on the target tunnel by using the UP device based on the reset tunnel keepalive sequence numbers of the target tunnel and an identifier of the target tunnel. For a specific implementation, refer to detailed descriptions of step 3032 in the embodiment shown in FIG. 3, and details are not described herein again.

Optionally, the indication unit is specifically configured to: send a second control request packet to the remote network device through the UP device, where the second control request packet carries the identifier of the target tunnel, the reset tunnel keepalive sequence numbers of the target tunnel, and sequence number reset indication information; and receive, through the UP device, a second control reply packet sent by the remote network device, where the second control reply packet is used to indicate that the remote network device successfully resets the tunnel keepalive sequence numbers of the target tunnel. For a specific implementation, refer to detailed descriptions of step 303 in the embodiment shown in FIG. 3, and details are not described herein again.

Optionally, the tunnel keepalive module 703 further includes: a creation unit, configured to create a data reconciliation tunnel to the remote network device; a first sending unit, configured to send, by using the UP device, a second data reconciliation packet to the remote network device through the data reconciliation tunnel, where the second data reconciliation packet carries an identifier of a tunnel established between the UP device and the remote network device that is stored in the CP device; a first receiving unit, configured to receive, through the UP device, a second reconciliation reply packet sent by the remote network device, where the second reconciliation reply packet carries an identifier of a tunnel established between the remote network device and the UP device that is stored in the remote network device; and a first determining unit, configured to determine an intersection set of the tunnel identifier carried in the second data reconciliation packet and the tunnel identifier carried in the second reconciliation reply packet as identifiers of the one or more tunnels.

Optionally, the tunnel keepalive module 703 further includes: a second sending unit, configured to send a second session data reconciliation packet to the remote network device through the UP device, where the second session data reconciliation packet carries identifiers of one or more first reference sessions, and the one or more first reference sessions are sessions carried on the target tunnel that are stored in the CP device; a second receiving unit, configured to receive, through the UP device, a second session reconciliation reply packet sent by the remote network device, where the second session reconciliation reply packet carries identifiers of one or more third reference sessions, and the one or more third reference sessions are sessions carried on the target tunnel that are stored in the remote network device; and a second determining unit, configured to determine an intersection set of the identifiers of the one or more first reference sessions and the identifiers of the one or more third reference sessions as an identifier of a session carried on the target tunnel. For a specific implementation, refer to detailed descriptions of step 303 in the embodiment shown in FIG. 3, and details are not described herein again.

Optionally, the tunnel keepalive module 703 further includes: a third sending unit, configured to send second tunnel information to the UP device, where the second tunnel information includes information about one or more tunnels established between the UP device and the remote network device that is stored in the CP device at a first moment, and the first moment is a moment at which the CP device completes tunnel failure recovery or session failure recovery with the remote network device by using the UP device after communication between the UP device and the CP device recovers. For a specific implementation, refer to detailed descriptions of step 303 in the embodiment shown in FIG. 3, and details are not described herein again.

Optionally, the CP device communicates with the UP device by using a control packet redirection interface and a state control interface.

The processing module 702 includes: a monitoring unit, configured to monitor statuses of the control packet redirection interface and the state control interface; and a third determining unit, configured to: if it is detected that the status of the control packet redirection interface and/or the status of the state control interface are/is abnormal, determine that a failure is detected in communication between the CP device and the UP device. For a specific implementation, refer to detailed descriptions of step 302 in the embodiment shown in FIG. 3, and details are not described herein again.

Optionally, the first tunnel information is carried in a PFCP update request packet, the one or more tunnels are layer 2 tunnel protocol L2TP tunnels, and information about each of the one or more tunnels includes tunnel description information.

If the L2TP tunnel is created according to IPv4, the tunnel description information includes a local tunnel identifier, a remote tunnel identifier, a local tunnel IPv4 address, and a remote tunnel IPv4 address.

If the L2TP tunnel is created according to IPv6, the tunnel description information includes a local tunnel identifier, a remote tunnel identifier, a local tunnel IPv6 address, and a remote tunnel IPv6 address. For a specific implementation, refer to detailed descriptions of step 301 in the embodiment shown in FIG. 3, and details are not described herein again.

Optionally, the second tunnel information is carried in a PFCP update request packet.

Optionally, the network device 700 further includes: a fourth sending module, configured to send first session information to the UP device, where the first session information includes information about a session carried on the one or more tunnels.

Optionally, the first session information is carried in a PFCP update request packet, and information about a session carried on each of the one or more tunnels includes a local tunnel identifier, a local session identifier, and a remote session identifier. For a specific implementation, refer to detailed descriptions of step 301 in the embodiment shown in FIG. 3, and details are not described herein again.

Optionally, the first sending module includes: a fifth sending unit, configured to: each time a tunnel is created, send information about the created tunnel to the UP device, where the one or more tunnels include the created tunnel; or a sixth sending unit, configured to periodically send locally stored tunnel information to the UP device.

In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device. This solution can ensure that a network connection between a terminal and a remote end is not interrupted, that is, a user service is not affected.

It should be noted that, when the network device provided in the foregoing embodiment performs tunnel keepalive, division of the foregoing functional modules is only used as an example for description. In an actual application, the functions may be allocated to different functional modules for implementation as required. To be specific, an internal structure of an apparatus is divided into different functional modules to implement all or a part of the functions described above. In addition, the network device provided in the foregoing embodiments pertains to a same concept as the embodiment of the tunnel keepalive method. For a specific implementation process of the network device, refer to the method embodiment. Details are not described herein.

An embodiment of this application provides a network system, which may also be referred to as a tunnel keepalive system. The network system includes a CP device, a UP device, and a remote network device. The CP device and the UP device are configured to interact with the remote network device to ensure that a terminal accesses a network. The UP device and the CP device have corresponding functions of implementing the tunnel keepalive method provided in the foregoing embodiment, so as to perform tunnel keepalive by using the system. For a specific implementation, refer to detailed descriptions of the embodiment shown in FIG. 3, and details are not described herein again.

In the embodiments of this application, before a failure occurs in communication between a UP device and a CP device, the UP device receives tunnel information synchronized by the CP device. After a failure occurs in communication between the UP device and the CP device, the UP device performs tunnel keepalive based on the tunnel information, that is, the UP device maintains a tunnel between the UP device and a remote network device. In this way, tunnel teardown is not triggered because of the failure in communication between the CP device and the UP device. This solution can ensure that a network connection between a terminal and a remote end is not interrupted, that is, a user service is not affected.

It should be noted that the network system provided in the foregoing embodiments pertains to a same concept as the embodiment of the tunnel keepalive method. For a specific implementation process of the network system, refer to the method embodiment. Details are not described herein.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (solid state drive, SSD)), or the like. It should be noted that the computer-readable storage medium mentioned in this embodiment of this application may be a non-volatile storage medium, or in other words, may be a non-transitory storage medium.

It should be understood that "at least one" mentioned in this specification means one or more, and that "a plurality of" means at least two. In the descriptions of the embodiments of this application, unless otherwise stated, "/" represents an OR meaning, for example, A/B may represent A or B; and "and/or" in this specification is merely an association relationship for describing associated objects and represents that three relationships may exist. For example, A and/or B may represent the following three cases: only A exists, both A and B exist, and only B exists. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A network device, applied to a user plane (UP) device of a virtual broadband network gateway (vBNG), the network device comprises:

at least one processor; and one or more non-transitory memories coupled to the at least one processor and storing programming instructions, wherein the programming instructions, when executed by the at least one processor, cause the network device to:

receive first tunnel information sent by a control plane (CP) device of the vBNG, the CP device of the vBNG being separate from the UP device of the vBNG, wherein the first tunnel information comprises information about one or more tunnels established between the UP device and a remote network device; and when the UP device detects that communication between the UP device and the CP device fails, perform tunnel keepalive on the one or more tunnels between the UP device and the remote network device based on the first tunnel information.

2. The network device according to claim 1, wherein the first tunnel information comprises identifier(s) of the one or more tunnels; and the programming instructions, when executed by the at least one processor, further cause the network device to:

monitor a first tunnel keepalive packet sent by the remote network device, wherein the first tunnel keepalive packet carries an identifier and tunnel keepalive sequence numbers of a target tunnel in the one or more tunnels; and send a second tunnel keepalive packet to the remote network device based on the identifier and the tunnel keepalive sequence numbers of the target tunnel, and the identifiers of the one or more tunnels.

3. The network device according to claim 1, wherein the first tunnel information comprises identifier(s) of the one or more tunnels; and the programming instructions, when executed by the at least one processor, further cause the network device to:

reset tunnel keepalive sequence numbers of a target tunnel, wherein the target tunnel is one of the one or more tunnels;

indicate the remote network device to reset the tunnel keepalive sequence numbers of the target tunnel based on the reset tunnel keepalive sequence numbers of the target tunnel; and after the remote network device successfully resets the tunnel keepalive sequence numbers of the target tunnel, perform tunnel keepalive on the target tunnel based on the reset tunnel keepalive sequence numbers of the target tunnel and an identifier of the target tunnel.

4. The network device according to claim 3, wherein the programming instructions, when executed by the at least one processor, further cause the network device to: based on the reset tunnel keepalive sequence numbers of the target tunnel, send a first control request packet to the remote network device, wherein the first control request packet carries an identifier of the target tunnel, the reset tunnel keepalive sequence numbers of the target tunnel, and sequence number reset indication information; and receive a first control reply packet sent by the remote network device, wherein the first control reply packet indicates that the remote network device successfully resets the tunnel keepalive sequence numbers of the target tunnel.

5. The network device according to claim 3, wherein the programming instructions, when executed by the at least one processor, further cause the network device to: based on the reset tunnel keepalive sequence numbers of the target tunnel, create a data reconciliation tunnel between the UP device and the remote network device;

send a first tunnel data reconciliation packet to the remote network device through the data reconciliation tunnel, wherein the first tunnel data reconciliation packet carries an identifier of at least one first tunnel established between the UP device and the remote network device, the identifier of the at least one first tunnel being stored in the UP device;

receive a first tunnel reconciliation reply packet sent by the remote network device, wherein the first tunnel reconciliation reply packet carries an identifier of at least one second tunnel established between the remote network device and the UP device, the identifier of the at least one second tunnel being stored in the remote network device; and determine identifier(s) belonging to identifier(s) carried in the first tunnel data reconciliation packet and identifier(s) carried in the first tunnel reconciliation reply packet as the identifier(s) of the one or more tunnels.

6. The network device according to claim 5, wherein the programming instructions, when executed by the at least one processor, further cause the network device to:

receive first session information sent by the CP device, wherein the first session information comprises information about a session carried on the one or more tunnels;

send a first session data reconciliation packet to the remote network device, wherein the first session data reconciliation packet carries identifier(s) of one or more first reference sessions, and the one or more first reference sessions are sessions that are carried on the target tunnel and that are stored in the UP device;

receive a first session reconciliation reply packet sent by the remote network device, wherein the first session reconciliation reply packet carries identifier(s) of one or more second reference sessions, and the one or more second reference sessions are sessions that are carried on the target tunnel and that are stored in the remote network device; and determine an identifier belonging to the identifier(s) of the one or more first reference sessions and the identifier(s) of the one or more second reference sessions as an identifier of a session carried on the target tunnel.

7. The network device according to claim 6, wherein the first session information is carried in a packet forwarding control protocol (PFCP) update request packet, and information about a session carried on each of the one or more tunnels comprises a local tunnel identifier, a local session identifier, and a remote session identifier.

8. The network device according to claim 1, wherein the programming instructions, when executed by the at least one processor, further cause the network device to:

when the UP device detects that the communication between the UP device and the CP device is recovered, stop performing tunnel keepalive on the one or more tunnels.

9. The network device according to claim 8, wherein the programming instructions, when executed by the at least one processor, further cause the network device to:

receive second tunnel information sent by the CP device, wherein the second tunnel information comprises information that is about one or more third tunnels established between the UP device and the remote network device and that is stored in the CP device at a first moment, and the first moment is a moment at which the CP device completes tunnel failure recovery or session failure recovery with the remote network device using the UP device after the communication between the UP device and the CP device recovers; and update tunnel information stored in the UP device based on the second tunnel information.

10. The network device according to claim 9, wherein the second tunnel information is carried in a packet forwarding control protocol (PFCP) update request packet.

11. The network device according to claim 1, wherein the UP device communicates with the CP device through a control packet redirection interface and a state control interface; and the programming instructions, when executed by the at least one processor, further cause the network device to:

monitor statuses of the control packet redirection interface and the state control interface; and when the UP device detects that a status of the control packet redirection interface and/or a status of the state control interface are/is abnormal, determine that a failure is detected in the communication between the UP device and the CP device.

12. The network device according to claim 1, wherein the first tunnel information is carried in a packet forwarding control protocol (PFCP) update request packet, the one or more tunnels are layer 2 tunnel protocol (L2TP) tunnels, and information about each tunnel in the one or more tunnels comprises tunnel description information; and when an L2TP tunnel is created according to internet protocol version 4 (IPv4), the tunnel description information of the L2TP tunnel comprises a local tunnel identifier, a remote tunnel identifier, a local tunnel IPv4 address, and a remote tunnel IPv4 address; or when an L2TP tunnel is created according to internet protocol version 6 (IPv6), the tunnel description information of the L2TP tunnel comprises a local tunnel identifier, a remote tunnel identifier, a local tunnel IPv6 address, and a remote tunnel IPv6 address.

13. A network device, applied to a control plane (CP) device of a virtual broadband network gateway (vBNG), the network device comprises:

at least one processor; and one or more non-transitory memories coupled to the at least one processor and storing programming instructions, wherein the programming instructions, when executed by the at least one processor, cause the network device to:

send first tunnel information to a user plane (UP) device of the vBNG, the UP device of the vBNG being separate from the CP device of the vBNG, wherein the first tunnel information comprises information about one or more tunnels established between the UP device and a remote network device; and wherein the first tunnel information enables the UP device to perform, based on the first tunnel information when communication between the UP device and the CP device fails, tunnel keepalive on the one or more tunnels established between the UP device and the remote network device.

14. A virtual broadband network gateway (vBNG) comprising a control plane (CP) device and a user plane (UP) device that are separated, wherein the UP device is configured to:

receive first tunnel information sent by the CP device, wherein the first tunnel information comprises information about one or more tunnels established between the UP device and a remote network device; and when the UP device detects that communication between the UP device and the CP device fails, perform tunnel keepalive on the one or more tunnels between the UP device and the remote network device based on the first tunnel information.

15. The vBNG according to claim 14, wherein the first tunnel information comprises identifier(s) of the one or more tunnels; and the UP device is further configured to:

monitor a first tunnel keepalive packet sent by the remote network device, wherein the first tunnel keepalive packet carries an identifier and tunnel keepalive sequence numbers of a target tunnel in the one or more tunnels; and send a second tunnel keepalive packet to the remote network device based on the identifier and the tunnel keepalive sequence numbers of the target tunnel, and the identifiers of the one or more tunnels.

16. The vBNG according to claim 14, wherein the first tunnel information comprises identifier(s) of the one or more tunnels; and the UP device is further configured to:

reset tunnel keepalive sequence numbers of a target tunnel, wherein the target tunnel is one of the one or more tunnels;

indicate the remote network device to reset the tunnel keepalive sequence numbers of the target tunnel based on the reset tunnel keepalive sequence numbers of the target tunnel; and after the remote network device successfully resets the tunnel keepalive sequence numbers of the target tunnel, perform tunnel keepalive on the target tunnel based on the reset tunnel keepalive sequence numbers of the target tunnel and an identifier of the target tunnel.

17. The vBNG according to claim 14, wherein the UP device is further configured to:

when the UP device detects that the communication between the UP device and the CP device is recovered, stop performing tunnel keepalive on the one or more tunnels.

18. The vBNG according to claim 17, wherein the UP device is further configured to:

receiving second tunnel information from the CP device in a packet forwarding control protocol (PFCP) update request packet, wherein the second tunnel information comprises information that is about one or more second tunnels established between the UP device and the remote network device and that is stored in the CP device at a first moment, and the first moment is a moment at which the CP device completes tunnel failure recovery or session failure recovery with the remote network device using the UP device after the communication between the UP device and the CP device recovers.

19. The vBNG according to claim 14, wherein the UP device communicates with the CP device through a control packet redirection interface and a state control interface; and the UP device is further configured to:

monitor statuses of the control packet redirection interface and the state control interface; and when the UP device detects that a status of the control packet redirection interface and/or a status of the state control interface are/is abnormal, determine that a failure is detected in the communication between the UP device and the CP device.

20. The vBNG according to claim 14, wherein the first tunnel information is carried in a packet forwarding control protocol (PFCP) update request packet, the one or more tunnels are layer 2 tunnel protocol (L2TP) tunnels, and the information about the one or more tunnels comprises tunnel description information of each tunnel of the one or more tunnels; and when the L2TP tunnel is created according to internet protocol version 4 (IPv4), the tunnel description information of the L2TP tunnel comprises a local tunnel identifier, a remote tunnel identifier, a local tunnel IPv4 address, and a remote tunnel IPv4 address; or when the L2TP tunnel is created according to internet protocol version 6 (IPv6), the tunnel description information of the L2TP tunnel comprises a local tunnel identifier, a remote tunnel identifier, a local tunnel IPv6 address, and a remote tunnel IPv6 address.

* * * * *